US009839944B2

(12) United States Patent
Kim et al.

(10) Patent No.: US 9,839,944 B2
(45) Date of Patent: Dec. 12, 2017

(54) DISHWASHER AND CONTROL METHOD THEREOF

(71) Applicant: LG ELECTRONICS INC., Seoul (KR)

(72) Inventors: Seongho Kim, Seoul (KR); Jaechul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 92 days.

(21) Appl. No.: 14/738,168

(22) Filed: Jun. 12, 2015

(65) Prior Publication Data

US 2015/0359405 A1 Dec. 17, 2015

(30) Foreign Application Priority Data

Jun. 12, 2014 (KR) ........................ 10-2014-0071650

(51) Int. Cl.
*B08B 7/04* (2006.01)
*B08B 3/02* (2006.01)
(Continued)

(52) U.S. Cl.
CPC ............ *B08B 3/02* (2013.01); *A47L 15/0049* (2013.01); *A47L 15/4214* (2013.01);
(Continued)

(58) Field of Classification Search
CPC .... B08B 3/00; B08B 3/02; B08B 3/04; B08B 7/00; B08B 7/04; A47L 15/00;
(Continued)

(56) References Cited

U.S. PATENT DOCUMENTS 8,295,984 B2 10/2012 Heisele
2007/0163626 A1 7/2007 Klein
(Continued)

FOREIGN PATENT DOCUMENTS

CN 1909822 2/2007
CN 101657138 2/2010
(Continued)

OTHER PUBLICATIONS

European Search Report dated Oct. 20, 2015, for Application No. 15171591.9, 6 pages.
(Continued)

*Primary Examiner* — Saeed T Chaudhry
(74) *Attorney, Agent, or Firm* — Fish & Richardson P.C.

(57) ABSTRACT

A control method of a dishwasher that includes at least two flow paths having different flow rates, a chamber having communication holes that each communicate with a respective flow path, a water supply pump configured to supply washing water to the chamber through an impeller rotated by a motor, and a flow path switching unit located within the chamber and configured to sequentially open the communication holes is described. The control method includes the actions of measuring an amount of current supplied to the motor while the motor rotates the impeller to supply washing water to the chamber, and determining a position of the flow path switching unit by comparing the amount of current supplied to the motor with reference current amounts that are each designated as an amount of current supplied to the motor when the motor rotates the impeller to supply washing water to the respective flow path.

15 Claims, 25 Drawing Sheets

(51) Int. Cl.
*A47L 15/00* (2006.01)
*A47L 15/42* (2006.01)
*A47L 15/23* (2006.01)

(52) U.S. Cl.
CPC ............ *A47L 15/4221* (2013.01); *B08B 7/04* (2013.01); *A47L 15/23* (2013.01); *A47L 2401/08* (2013.01); *A47L 2501/26* (2013.01)

(58) Field of Classification Search
CPC .. A47L 15/0049; A47L 15/23; A47L 15/4221; A47L 2501/26; A47L 2401/08
See application file for complete search history.

(56) References Cited

U.S. PATENT DOCUMENTS

| | | | | |
|---|---|---|---|---|
| 2010/0121497 | A1 | 5/2010 | Heisele | |
| 2012/0279536 | A1 | 11/2012 | Adams | |
| 2013/0305592 | A1* | 11/2013 | Matsumura ........ | B01D 11/0492 44/307 |
| 2015/0156606 | A1* | 6/2015 | Shuster ................. | H04W 4/023 455/414.3 |

FOREIGN PATENT DOCUMENTS

| | | | |
|---|---|---|---|
| EP | 1 566 477 | A1 | 8/2005 |
| EP | 2 522 268 | A1 | 11/2012 |
| JP | 2008-289681 | A | 12/2008 |
| JP | 5146331 | B2 | 2/2013 |
| KR | 10-2012-0022427 | | 3/2012 |
| KR | 10-2012-0126596 | | 11/2012 |
| WO | WO 2005/070275 | A1 | 8/2005 |
| WO | WO 2008/125482 | A2 | 10/2008 |

OTHER PUBLICATIONS

Office Action issued in Australian Application No. 2015203138 on Jun. 16, 2016, 4 pages.

Chinese Office Action in Chinese Application No. 201510324606.5, dated Jun. 20, 2017, 24 pages (with English translation).

* cited by examiner

DISHWASHER AND CONTROL METHOD THEREOF

This application claims the benefit of Korean Patent Application No. KR10-2014-0071650, filed Jun. 12, 2014 which is hereby incorporated by reference as if fully set forth herein.

FIELD

The present disclosure relates to a dishwasher and a control method of a dishwasher.

BACKGROUND

A dishwasher is an apparatus to remove garbage, such as leftover food, from dishes or cooking utensils (hereinafter, "objects to be washed") using a detergent and washing water.

In general, a dishwasher includes a tub providing a washing space, dish racks provided within the tub so as to receive objects to be washed, spray arms to spray washing water to the racks, a sump to store washing water therein, and supply paths to supply the washing water stored in the sump to the spray arms.

The dishwasher including the above elements may remove garbage from objects to be washed, which are received in the racks, by spraying washing water to the objects to be washed according to a washing course selected by a user, and dry the objects to be washed, from which garbage has been removed, through hot air.

SUMMARY

According to an innovative aspect of the subject matter described in this application, a control method of a dishwasher configured to spray washing water to objects to be washed that the dishwasher including at least two flow paths having different flow rates, a chamber having communication holes that each communicate with a respective flow path, a water supply pump configured to supply washing water to the chamber through an impeller rotated by a motor, and a flow path switching unit located within the chamber and configured to sequentially open the communication holes based on washing water being supplied to the chamber, the control method includes the actions of measuring an amount of current supplied to the motor while the motor rotates the impeller to supply washing water to the chamber; and determining a position of the flow path switching unit by comparing the amount of current supplied to the motor with reference current amounts that are each designated as an amount of current supplied to the motor when the motor rotates the impeller to supply washing water to the respective flow path.

The method may include one or more of the following optional features. The method includes the action of notifying a user of malfunction of the dishwasher, based on the amount of current supplied to the motor not being equal to any of the reference current amounts. The action of notifying the user of the malfunction of the dishwasher includes notifying the user through an alarm unit located in the dishwasher by at least one of displaying a character signal on a display of the alarm unit or outputting a sound signal using a speaker of the alarm unit. Based on the amount of current supplied to the motor not being equal to a reference current amount for position judgment that is designated as one of the reference current amounts, the method includes the actions of intercepting, for measurement, power supplied to the motor; and measuring a second amount of current supplied to the motor while the motor rotates the impeller to supply washing water to the chamber by resupplying power to the motor. The method includes the action of repeating the interception and the measurement of the second amount of current until an amount of current measured in the measurement of the second amount of current is equal to the reference current amount for position judgment. A largest current amount and a smallest current amount of the reference current amounts are designated as reference current amounts for position judgment. The action of measuring the amount of current supplied to the motor includes measuring the amount of current supplied to the motor after a predetermined time from supplying power to the motor has elapsed. Each of the reference current amounts is a range having a maximum current amount and a minimum current amount.

According to another innovative aspect of the subject matter described in this application a control method of a dishwasher configured to spray washing water to objects to be washed the dishwasher including three flow paths with a first flow path having a different flow rate than a second flow path and a third flow path, a chamber having three communication holes that each communicate with a respective flow path, a water supply pump configured to supply washing water to the chamber through an impeller rotated by a motor, and a flow path switching unit located within the chamber and configured to sequentially open the communication holes based on washing water being supplied to the chamber, the control method includes the actions of measuring an amount of current supplied to the motor while the motor rotates the impeller to supply washing water to the chamber by supplying power to the motor; and determining at least one of a state of the flow path switching unit or a position of the flow path switching unit by comparing the amount of current supplied to the motor with reference current amounts that are each designated as an amount of current supplied to the motor when the motor rotates the impeller to supply washing water to the respective flow paths.

The method may include one or more of the following optional features. The actions further include notifying a user of malfunction of the dishwasher through an alarm unit located in the dishwasher by at least one of displaying a character signal on a display of the alarm unit or outputting a sound signal using a speaker of the alarm unit, based on the amount of current supplied to the motor not being equal to any of the reference current amounts. Based on the amount of current supplied to the motor is not being equal to a reference current amount for position judgment that is designated as one of the reference current amounts, the actions further include intercepting, for measurement, power supplied to the motor; and measuring a second amount of current resupplied to the motor while the motor rotates the impeller to supply washing water to the chamber by resupplying power to the motor. The actions further include repeating the interception and the measurement of the second amount of current until the amount of current measured in the measurement of the second amount of current is equal to the reference current amount for position judgment. The reference current amount for position judgment is designated as an amount of current supplied to the motor when the motor rotates the impeller to supply washing water to the first flow path. Each of the reference current amounts is a range having a maximum current amount and a minimum current amount. The action of measuring the amount of current supplied to the motor includes measuring the amount of current supplied to the motor after a predetermined time from supplying power to the motor has elapsed.

An object of the subject matter described in this application is to provide a dishwasher having improved washing ability and a control method thereof.

Another object of the subject matter described in this application is to provide a dishwasher in which a plurality of washing water flow paths is provided on one spray arm to spray washing water, and a control method thereof.

Another object of the subject matter described in this application is to provide a dishwasher having a flow path switching unit to selectively open a plurality of flow paths provided on one spray arm, and a control method thereof.

Yet another object of the subject matter described in this application is to provide a dishwasher which may judge the position a flow path switching unit and the state of the flow path switching unit, and a control method thereof.

DETAILED DESCRIPTION

Figure 1:
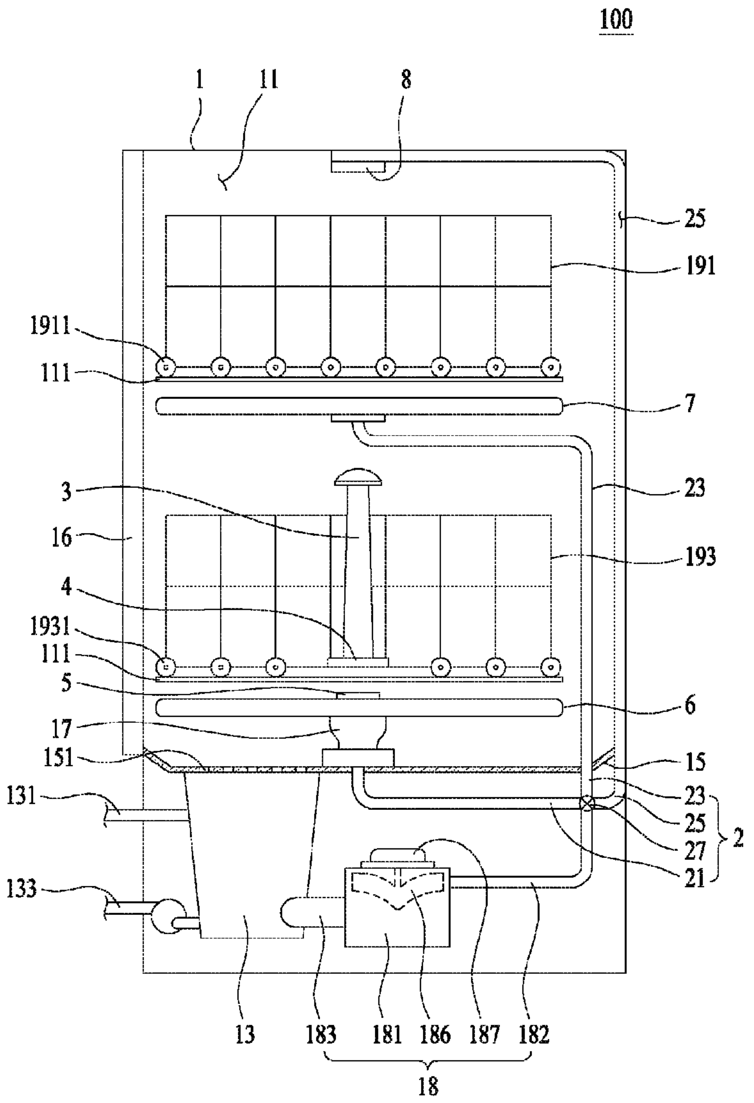
FIG. 1 is a view of an example dishwasher.

FIG. 1 illustrates an example dishwasher. Dishwasher 100 includes a cabinet 1 forming the external appearance of the dishwasher 100, a tub 11 located within the cabinet 1 and providing a washing space, a sump 13 located under the tub 11 and storing washing water therein (e.g., a unit to recover the washing water in the tub), a cover 15 located on the sump 13 to divide the tub 11 and the sump 13 from each other, and a door 16 provided on the cabinet 1 to open and close the washing space.

The sump 13 receives washing water through a sump water supply path 131, washing water in the sump 13 is discharged to the outside of the sump 13 through a sump drain path 133, and washing water sprayed to the inside of the tub 11 through spray arms 6, 7, and 8, which will be described alter, is recovered to the sump 13 through recovery holes 151 provided on the cover 15.

Racks to receive objects to be washed, such as dishes, are provided in the tub 11. The racks may include a first rack 191 and a second rack 193 located below the first rack 191 and, for convenience of description, the first rack 191 is referred to as an upper rack and the second rack 193 is referred to as a lower rack.

The upper rack 191 and the lower rack 193 may be withdrawn from the tub 11 when the door 16 opens the washing space. For this purpose, rails 111 may be provided on the inner surface of the tub 11 from the rear surface to the front surface of the dishwasher 100 having the door 16 and wheels 1911 and 1931 to support the respective racks 191 and 193 may be provided on the upper rack 191 and the lower rack 193.

Further, the dishwasher 100 may include a lower arm 6 provided within the tub 11 to wash objects to be washed, received in the lower rack 193, an upper arm 7 to wash objects to be washed, received in the upper arm 191, and a top nozzle 8 located above the upper arm 7 and supplying washing water to the upper rack 191 and the lower rack 193.

The lower arm 6, the upper arm 7, and the top nozzle 8 may be provided to supply washing water through a water supply pump 18 and a supply path unit 2.

The supply path unit 2 may include a first supply path 21 connected to the lower arm 6 through an arm holder 17, a second supply path 23 connected to the upper arm 7, a third supply path 25 connected to the top nozzle 8, and a supply path switching valve 27 to selectively open the respective supply paths 21, 23 and 25.

The water supply pump 18 may include a housing 181 having an impeller 186 provided therein, an inlet part 183 connecting the housing 181 to the sump 13, an outlet part 182 connecting the housing 181 to the supply path switching valve 27, and a motor 187 provided at the outside of the housing 181 to rotate the impeller 186.

Therefore, when power is supplied to the motor 187 and the impeller 186 is rotated, water introduced from the sump 13 to the housing 181 moves to the supply path switching valve 27 through the outlet part 182, and the water supplied to the supply path switching valve 27 is supplied to the supply arms 6 and 7 or the top nozzle 8 through the supply paths 21, 23, and 25 opened by the supply path switching valve 27.

The supply path switching valve 27 may be provided to sequentially open the respective supply paths 21, 23, and 25 or to simultaneously open at least two of the three supply paths 21, 23, and 25. The supply path switching valve 27 may have any structure which may perform such a function.

In some implementations, since objects to be washed, received in the lower rack 193, may be washed through the lower arm 6 and objects to be washed, received in the upper rack 192, may be washed through a tower flow path 3, which will be described later, the above-described upper arm 7 and top nozzle 8 may be omitted. If the upper arm 7 and top nozzle 8 are not provided in the tub 11, the height of the dishwasher 100 may be minimized.

In some implementations, the dishwasher 100 may further include the tower flow path 3 detachably provided on the lower rack 193 and extending in the direction of the upper rack 191 and a tower attachable unit 5 withdrawn from the lower arm 6 according to hydraulic pressure in the lower arm 6 and connected to the tower flow path 3 to supply washing water to the tower flow path 3.

Figure 2:
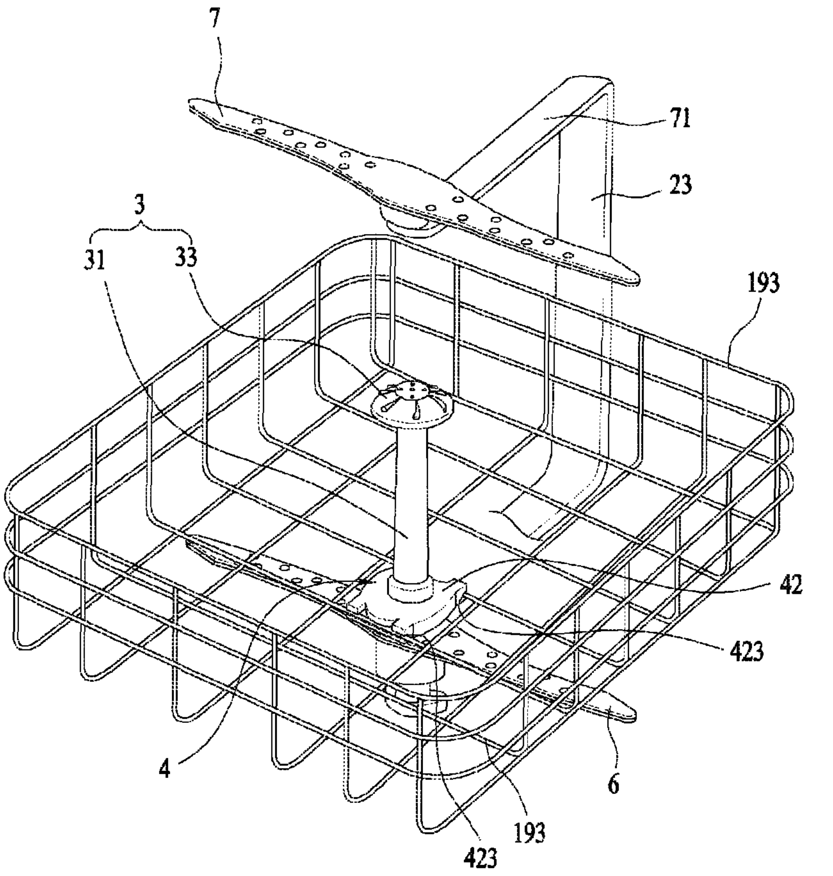
FIG. 2 is a view of an example upper arm, lower arm, and tower flow path of a dishwasher.

As shown in FIG. 2, the tower flow path 3 is fixed to a tower support unit 4 and the tower support unit 4 is detachably fixed to the lower rack 193. That is, the tower flow path 3 may be detachably attached to the lower rack 193 through the tower support unit 4.

The tower flow path 3 may include a body 31 fixed to the tower support unit 4 and a spray nozzle 33 to spray washing water supplied through the body 31 to the upper rack 191.

The body 31 may have a cylindrical shape, the upper and lower surfaces of which are opened, the spray nozzle 33 is combined with the upper surface of the body 31, and the tower support unit 4 is combined with the lower surface of the body 31.

The body 31 may have a structure, the diameter of which is decreased in the upward direction and such a structure serves to move washing water introduced through the lower surface of the body 31 to the spray nozzle 31 while maintaining a designated hydraulic pressure.

Figure 3A:
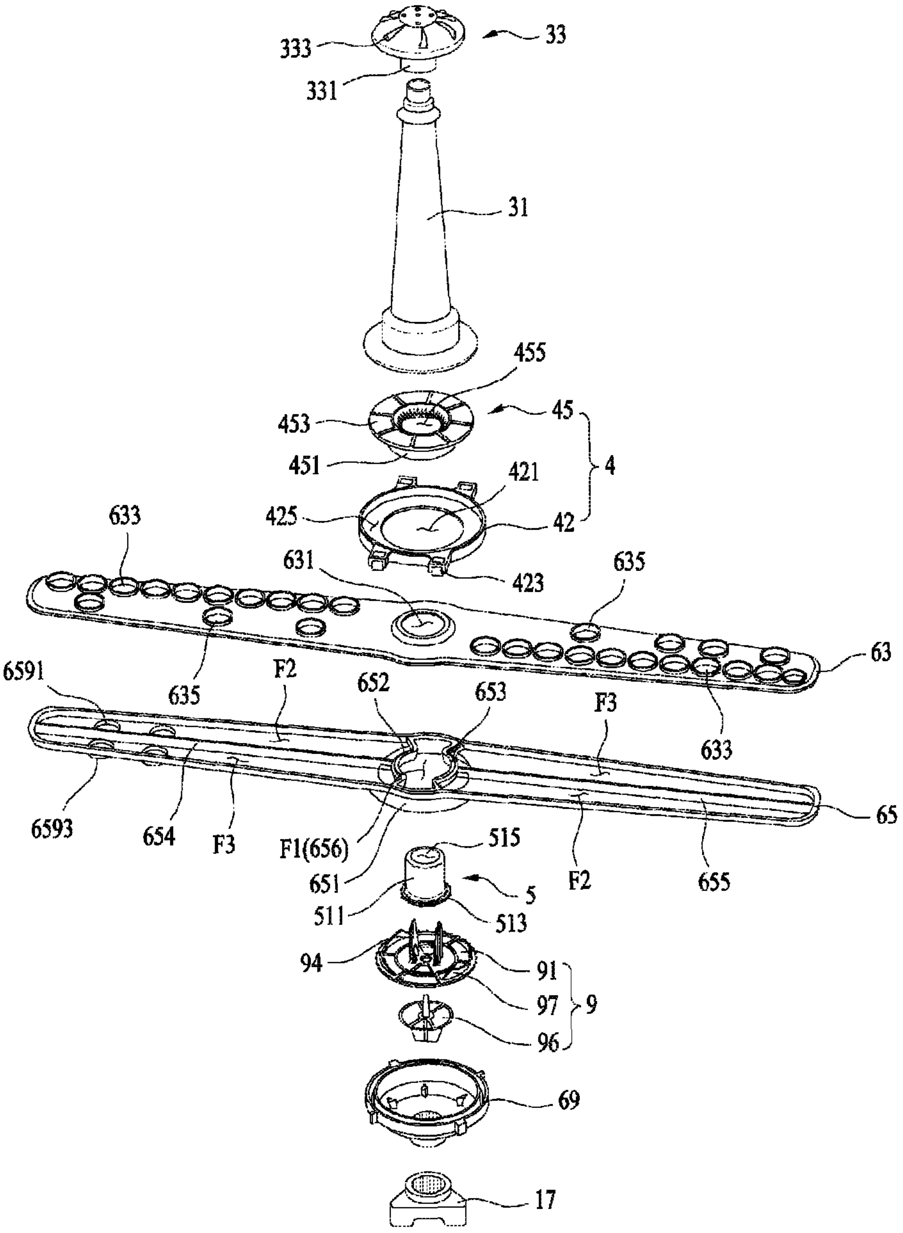
FIGS. 3A and 3B are exploded perspective views of an example tower flow path and lower arm.

As shown in FIG. 3A, the spray nozzle 33 may include a connection pipe 331 combined with the upper surface of the body 31 and a plurality of spray holes 333 to discharge washing water, introduced into the spray nozzle 33 through the connection pipe 331, to the outside of the spray nozzle 33.

The connection pipe 331 may combine the body 31 with the spray nozzle 33 such that the spray nozzle 33 may be rotated, and the spray holes 333 may be provided such that the spray nozzle 33 may be rotated by repulsive force of washing water discharged from the spray nozzle 33.

That is, the spray holes 333 may be disposed on the upper surface of the spray nozzle 33 in a spiral shape and provided to rotate the spray nozzle 33 in the clockwise direction or the counterclockwise direction when the spray holes 333 spray washing water.

The tower support unit 4 may include a fixing body 42 to which the body 31 of the tower flow path 3 is fixed and a connector 45 provided on the fixing body 42 so that the tower attachable unit 5 withdrawn from the lower arm 6 is connected to the connector 45.

The fixing body 42 may include a fixing body through hole 421 and rack combination parts 423.

The fixing body through hole 421 may be formed through the fixing body 42 and the rack combination parts 423 may have any shape which may detachably combine the fixing body 42 with the lower rack 193.

The connector 45 may include a connector body 451 having a cylindrical shape inserted into the fixing body through hole 421, a reception hole 455 formed through the connector body 451 and communicating with the body 31 of the tower flow path 3, and a connector flange 453 protruding from the circumferential surface of the connector body 451.

The connector flange 453 is supported by a flange arrival groove 425 protruding from the circumferential surface of the fixing body through hole 421 toward the center of the fixing body through hole 421.

The diameter of the connector body 451 is smaller than the diameter of the fixing body through hole 421 and the diameter of the connector flange 453 is greater than the diameter of the fixing body through hole 421 and smaller than the diameter of the flange arrival groove 425.

Therefore, the connector flange 453 may be arrived in the flange arrival groove 425 and prevent the connector body 451 from being withdrawn from the fixing body 42 through the fixing body through hole 421, and the connector body 421 may move within the fixing body through hole 421.

That is, since the connector body 451 may move within the fixing body through hole 42 in a radial manner, if the center of an attachable unit body 511 does not coincide with the center of the reception hole 455 by the position of the lower rack 193 or, if the lower rack 6 is rotated while not level, the tower attachable unit 5 and the reception hole 455 may be easily combined.

The tower attachable unit 5 withdrawn from the lower arm 6 to supply washing water to the tower flow path 3 includes the attachable unit body 511 provided on the lower arm 6.

The attachable unit body 511 is withdrawn from the lower arm 6 according to the pressure, such as hydraulic pressure, within a lower arm chamber 69, which will be described later, and connected to the reception hole 455 of the tower support unit 4 and, when the attachable unit body 511 is connected to the reception hole 455, washing water is supplied to the tower flow path 3 and a detailed description thereof will be given later in detail.

The attachable unit body 511 may have a cylindrical shape, the upper and lower surfaces of which are opened. The attachable unit body 511 includes a body through hole 515 formed through the center of the attachable unit body 511 and provided in the height direction of the attachable unit body 511, and an attachable unit flange 513 protruding from the circumferential surface of the attachable unit body 511.

The attachable unit flange 513 prevents the attachable unit body 511 from being withdrawn from the lower arm 6. For this purpose, the diameter of the outer circumferential surface of the attachable unit flange 513 is greater than the diameter of a first discharge hole 631 provided on the lower arm 6.

Figure 7A:
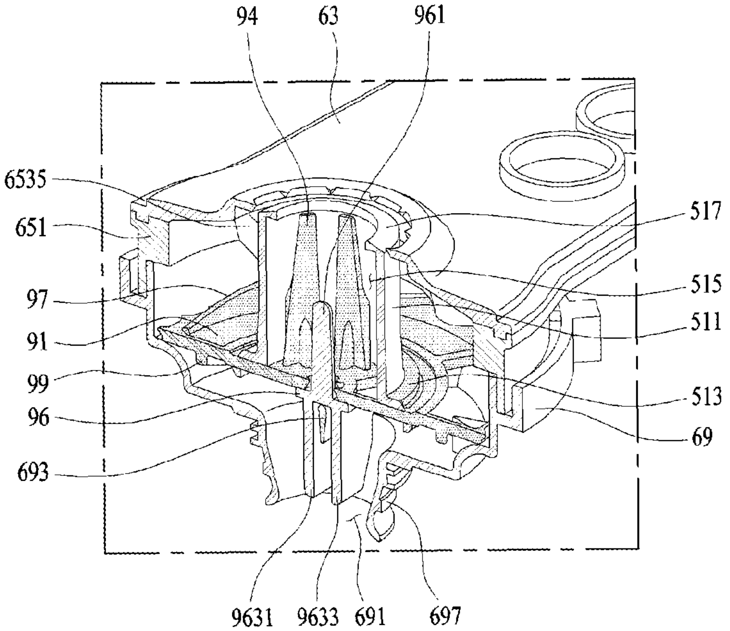
FIGS. 7A(a), 7A(b), 7B(a), 7B(b), and 8A to 8C are views of an example operation process of a flow path switching unit.
Figure 7A:
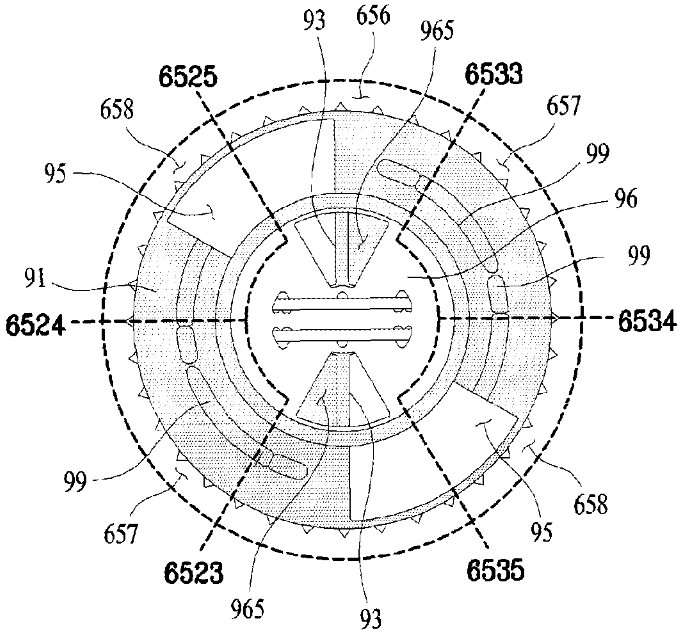

A guider support part 517, referring to FIGS. 7A(a), 7A(b), 7B(a), and 7B(b), protruding to the center of the body through hole 515 may be further provided on the upper surface of the attachable unit body 511. The guider support part 517 assists movement of the attachable unit body 511 and a detailed description thereof will be given later.

In some implementations, the lower arm 6 may include the lower arm chamber 69 supported by the arm holder 17 so as to be rotatable, a lower frame 65 having arm flow paths F1, F2, and F3 communicating with the lower arm chamber 69, and an upper frame 63 provided with discharge holes 631, 633, and 635 to discharge washing water introduced into the arm flow paths F1, F2, and F3 to the outside of the lower arm 6, which may be towards the lower rack.

The lower frame 65 includes a chamber communication hole 651 to which the lower arm chamber 69 is connected, and diaphragms 652, 653, 654, and 655 dividing the inner space of the lower frame 65 to form the arm flow paths F1, F2 and F3.

The arm flow paths F1, F2, and F3 provided in the lower arm 6 may include a first flow path F1, second flow paths F2 and third flow paths F3. The first flow path F1 is formed by the first diaphragm 652 and the second diaphragm 653 and the second flow paths F2 and the third flow paths F3 are divided by the third diaphragm 654 and the fourth diaphragm 655.

The first diaphragm 652 and the second diaphragm 653 are provided to divide the chamber communication hole 651 into three regions.

Figure 3B:
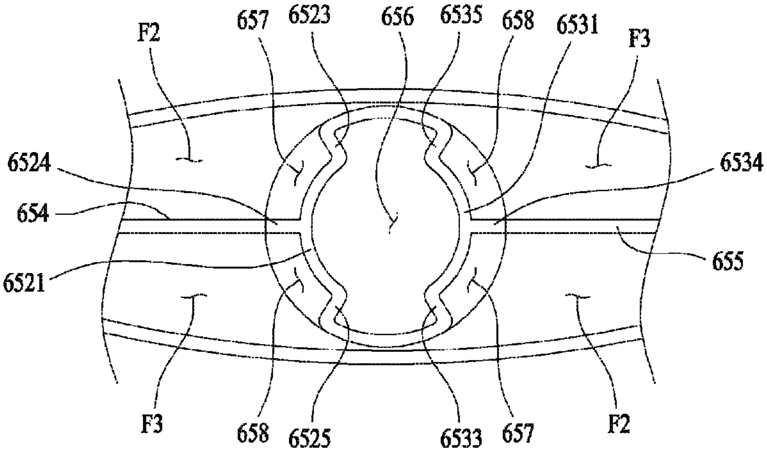

As shown in FIG. 3B, the first diaphragm 652 may include a first flange 6521 located within the chamber communication hole 651 and a first rib 6523, a second rib 6524 and a third rib 6525 fixing the first flange 6521 to the lower frame 65.

The second diagram 653 may include a second flange 6531 provided within the chamber communication hole 651 opposite the first flange 6521 and a fourth rib 6533, a fifth rib 6534 and a sixth rib 6535 fixing the second flange 6531 to the lower frame 65.

The first flange 6521 and the second flange 6531 need to be provided so that the attachable unit flange 513 may pass through the first flow path F1 formed by the first flange 6521 and the second flange 6531, and FIG. 3B illustrates the first flange 6521 and the second flange 6531 as having the same radius of curvature. A distance between the first flange 6521 and the second flange 6531 is greater than the diameter of the outer circumferential surface of the attachable unit flange 513.

The first rib 6523 and the third rib 6525 fix both ends of the first flange 6521 to the lower frame 65, and the second rib 6524 protrudes from the first flange 6521 to divide a space formed by the first rib 6523 and the third rib 6525 into two parts.

When the chamber communication hole 651 formed between the first rib 6523 and the third rib 6525 is divided into two parts by the second rib 6524, one part becomes a second communication hole 657 communicating the second flow path F2 and the lower arm chamber 69 with each other, and the other part becomes a third communication hole 658 communicating the third flow path F3 and the lower arm chamber 69 with each other.

Further, the fourth rib 6533 and the sixth rib 6535 fix both ends of the second flange 6531 to the lower frame 65, and the fifth rib 6534 protrudes from the second flange 6531 to divide a space formed by the fourth rib 6533 and the sixth rib 6535 into two parts.

When the chamber communication hole 651 formed between the fourth rib 6533 and the sixth rib 6535 into two parts by the fifth rib 6534, one part becomes a second communication hole 657 communicating the second flow path F2 and the lower arm chamber 69 with each other, and the other part becomes a third communication hole 658 communicating the third flow path F3 and the lower arm chamber 69 with each other.

The above-described six ribs 6523, 6524, 6525, 6533, 6534, and 6535 may be separated from one another by the same angle, for example, 60 degrees, based on the center of the chamber communication hole 651. The reason for this is that the above-described six ribs 6523, 6524, 6525, 6533, 6534 and 6535 are combined with upper gears 97 provided on a flow path switching unit 9 and serve as parts to rotate a switching unit body 91, e.g., upper gear fastening parts.

The third diaphragm 654 extends from the second rib 6524 and protrudes from the lower frame 65 to divide the inner surface of the lower frame 65, and the fourth diaphragm 655 extends from the fifth rib 6534 and protrudes from the lower frame 65 to divide the inner surface of the lower frame 65.

As shown in FIG. 3A, lower spray holes to spray washing water to the cover 15 may be further provided on the lower frame 65. The lower spray holes may include first lower spray holes 6591 to spray washing water introduced into the second flow path F2 to the cover 15 and second lower spray holes 6593 to spray washing water introduced into the third flow path F3 to the cover 15.

Washing water discharged through the respective lower spray holes 6591 and 6592 prevents the recovery holes 151 from being clogged with foreign substances.

The upper frame 63 includes a first discharge hole 631 located above the first communication hole 656, second discharge holes 633 to discharge washing water introduced into the second flow path F2 to the outside of the lower arm 6, and third discharge holes 635 to discharge washing water introduced into the third flow path F3 to the outside of the lower arm 6.

The first discharge hole 631 provides a space to withdraw the attachable unit body 511 of the tower attachable unit 5 from the lower arm 6, is located above the first communication hole 656, and has a smaller diameter than the first communication hole 656.

FIG. 3A illustrates the first discharge hole 631 as being located above the space formed by the first flange 6521 and the second flange 6531 and having a diameter which is greater than the diameter of the outer circumferential surface of the attachable unit body 511 and smaller than the diameter of the outer circumferential surface of the attachable unit flange 513.

The second discharge holes 633 and the third discharge holes 635 may be provided so that the lower arm 6 is rotated about the arm holder 17 by repulsive force of washing water discharged from the respective discharge holes 633 and 635.

In some implementations, first nozzles to spray washing water supplied to the second discharge holes 633 at a designated inclination angle to a plane parallel with the surface of the upper frame 63 are provided in the second discharge holes 633, and second nozzles to spray washing water supplied to the third discharge holes 635 at a designated inclination angle to the plane parallel with the surface of the upper frame 63 are provided in the third discharge holes 635.

The spray direction of washing water discharged from the first nozzles and the spray direction of washing water discharged from the second nozzles may be set to be opposite each other. The reason for this is that, if the rotating direction of the lower arm 6 when the second discharge holes 633 discharge washing water and the rotating direction of the lower arm 6 when the third discharge holes 635 discharge washing water are different, washing efficiency may be raised.

Further, the flow rate of washing water supplied to objects to be washed through the first flow path F1, the flow rate of washing water supplied to objects to be washed through the second flow paths F2, and the flow rate of washing water supplied to objects to be washed through the third flow paths F3 may be different.

FIG. 3A illustrates the second discharge holes 633 and the third discharge holes 635 as being provided in different numbers so that the flow rate of washing water supplied to objects to be washed through the third flow paths F3 is less than the flow rate of washing water supplied to objects to be washed through the second flow paths F2.

In some implementations, the flow rate of washing water through the tower flow path 3 receiving washing water supplied through the first flow path 1 and spraying the washing water may be equal to one of the flow rate of washing water through the second discharge holes 633 and the flow rate of washing water through the third discharge holes 635 or be different from the flow rate of washing water through the second discharge holes 633 and the flow rate of washing water through the third discharge holes 635.

Figure 4A:
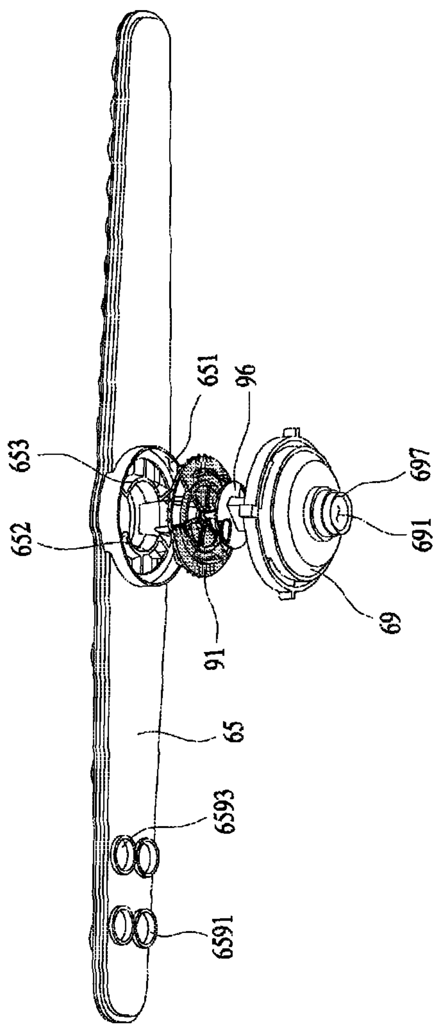
FIGS. 4A and 4B are views of an example lower arm and lower arm chamber.
Figure 4B:
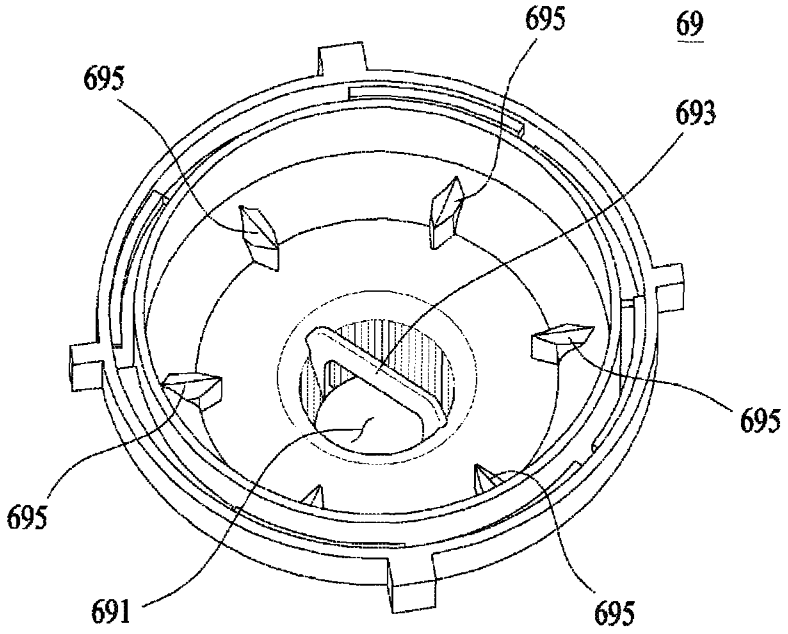

As shown in FIGS. 4A and 4B, the lower arm chamber 69 is fixed to the chamber communication hole 651 provided on the lower frame 65. The lower arm chamber 69 is combined with the lower frame 65 such that the first communication hole 656, the second communication holes 657 and the third communication holes 658 are located within the lower arm chamber 69. That is, the lower arm chamber 69 is provided to surround the first communication hole 656, the second communication holes 657 and the third communication holes 658.

The lower arm chamber 69 includes a support pipe 697 rotatably combined with the arm holder 17, an inlet hole 691 formed through the support pipe 697 to introduce washing water into the lower arm chamber 69, and lower gear fastening parts 695 provided on the inner circumferential surface of the lower arm chamber 69.

The lower gear fastening parts 695 are combined with lower gears 99, referring to FIG. 6B), of the flow path switching unit 9, which will be described later, and server to rotate the switching unit body 91 by a designated angle. A plurality of lower gear fastening parts 695 may be separated by the same angle along the circumferential surface of the lower arm chamber 69 and FIG. 4B illustrates the lower gear fastening parts 695 as being separated by 60 degrees based on the center of the inlet hole 691.

A guider 693, with which a support body 96 of the flow path switching unit 9 is combined, is provided within the lower arm chamber 69. The guider 693 needs to be provided at a lower position than the lower gear fastening parts 695. FIG. 4B illustrates the guider 693 as being fixed to the inner circumferential surface of the inlet hole 691.

The guider 693 may be provided in parallel with the third diaphragm 654 and the fourth diaphragm 655. The reason for this is to easily distribute washing water, introduced into the chamber 69, to the second communication holes 657 and the third communication holes 658.

The flow path switching unit 9 to sequentially open the first communication hole 656, the second communication holes 657 and the third communication holes 658 according to pressure, for example, hydraulic pressure, within the lower arm chamber 69 is provided within the lower arm chamber 69.

The flow path switching unit 9 may include a support part reciprocating within the lower arm chamber 69 according to pressure, for example, hydraulic pressure, within the lower arm chamber 69 and a switching part rotatably combined with the support part and located on the upper surface of the support part.

That is, the switching part may include a switching unit body 91 being rotatable within the lower arm chamber 69 and the support part may include a support body 96 provided within the lower arm chamber 69 and supporting the support unit body 91.

The support body 96 may reciprocate in the height direction of the lower arm chamber 69, e.g., a direction from the inlet hole 691 and the chamber communication hole 651, and thus assist reciprocation of the switching unit body 91 and provide a center of rotation of the switching unit body 91.

Figure 5A:
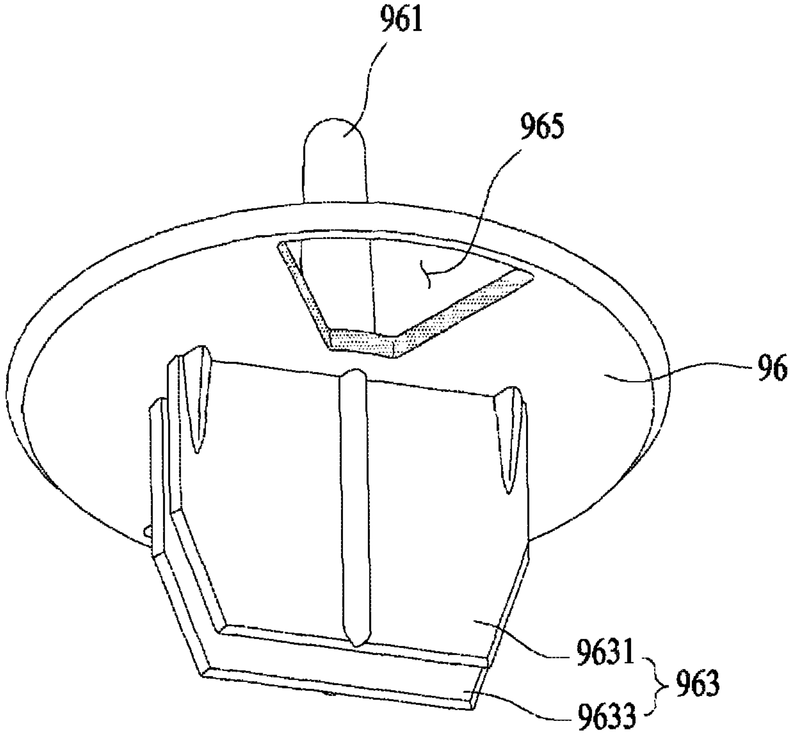
FIGS. 5A, 5B, 6A, and 6B are perspective views of an example support body and switching unit body of a flow path switching unit.
Figure 5B:
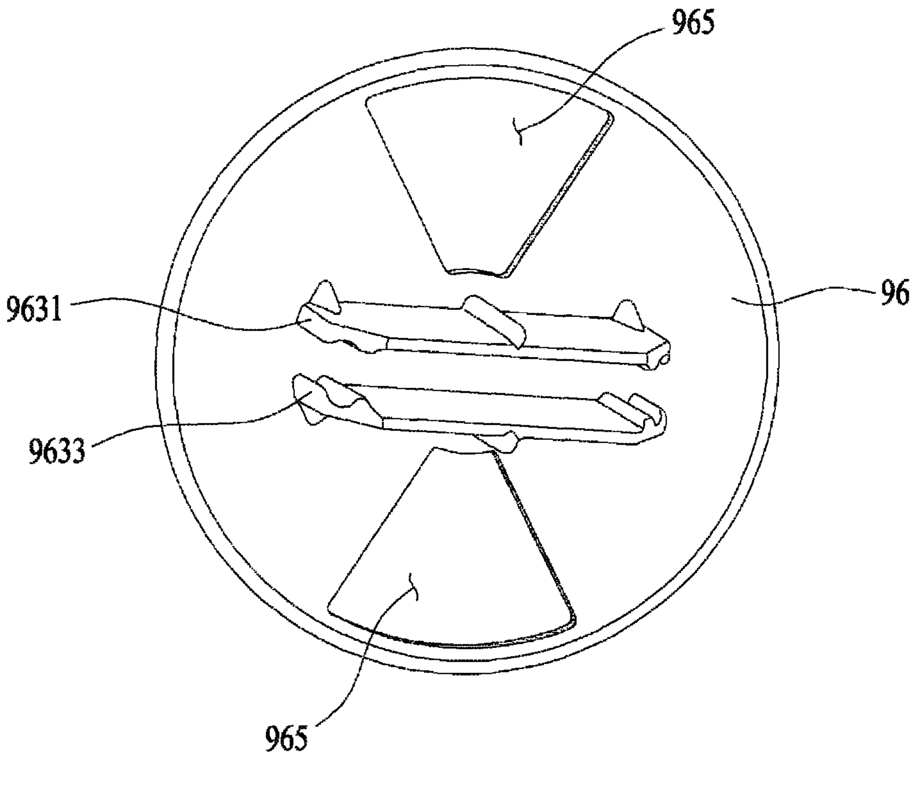

As shown in FIGS. 5A and 5B, the support body 96 may have a disc shape and include support body through holes 965 formed through the support body 96, a shaft 961 protruding from the upper surface of the support body 96 toward the switching unit body 91, and a guider combination unit 963 protruding from the lower surface of the support body 96 toward the guider 693 of the lower arm chamber 69.

Two support body through holes 965 may be separated from each other by 180 degrees based on the shaft 961. The support body through holes 965 are located within the space formed by the first through hole 656, when the guider combination unit 693 is combined with the guider 693.

The guider combination unit 963 may include a first combination part 9631 and a second combination part 9632 protruding from the lower surface of the support body 96, and the first combination part 9631 and the second combination part 9632 are separated from each other by a sufficient distance to receive the guider 693.

Further, the first combination part 9631 and the second combination part 9632 have a sufficient length to prevent separation of the first combination part 9631 and the second combination part 9632 from the guider 693 even if the support body 96 is raised to the maximum height within the lower arm chamber 69.

Therefore, when washing water is introduced into the lower arm chamber 69, the support body 96 is guided by the guider 693 and the guider combination unit 963 and raised in the height direction of the lower arm chamber 69 and, when washing water is not supplied to the lower arm chamber 69, the support body 96 is only lowered in the height direction of the lower arm chamber 69.

Figure 6A:
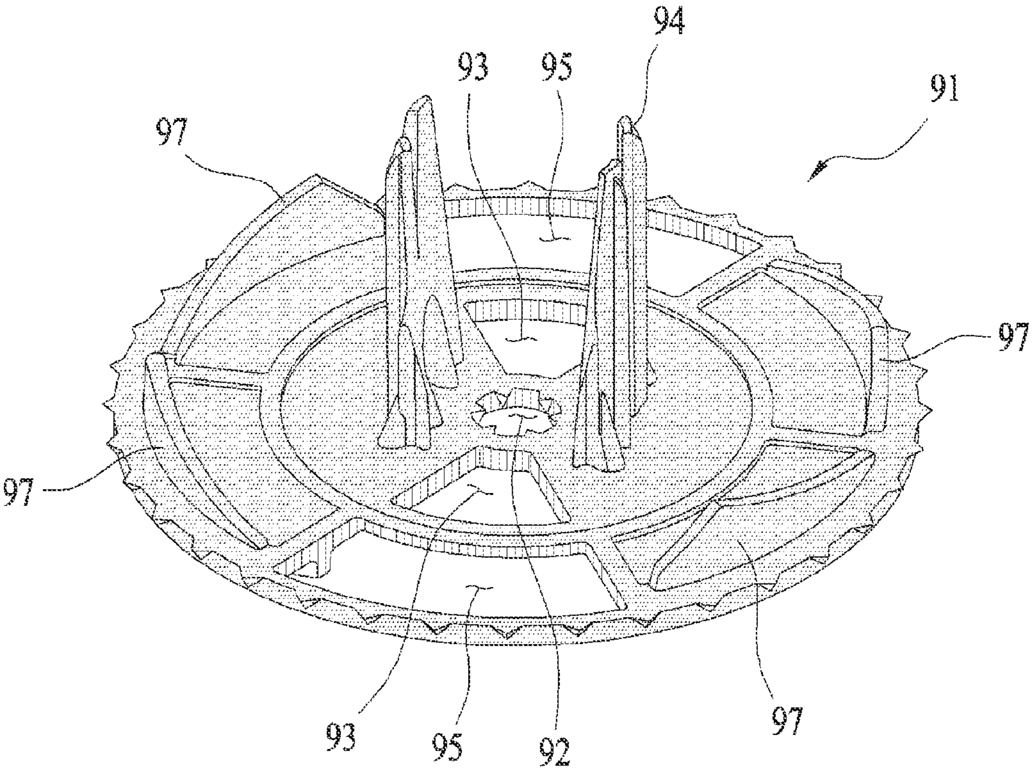
Figure 6B:
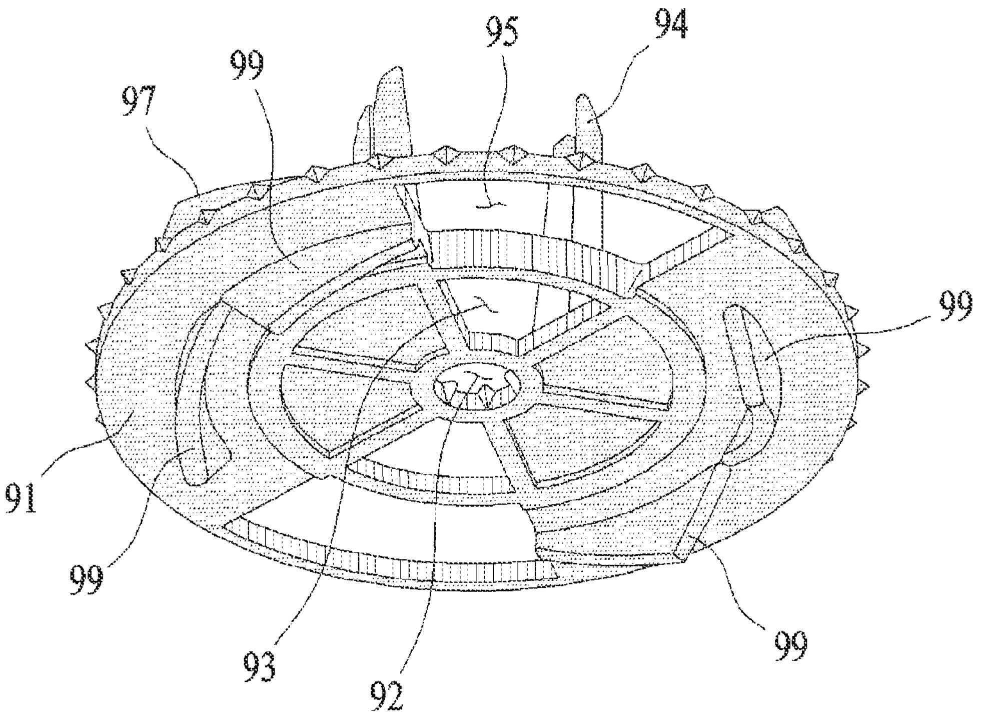

As shown in FIGS. 6A and 6B, the switching unit body 91 may have a disc shape and reciprocate between the inlet hole 691 of the lower arm chamber 69 and the chamber communication hole 651 according to hydraulic pressure in the lower arm chamber 69.

That is, the switching unit body 91 moves from the inlet hole 691 to the chamber communication hole 651, when the hydraulic pressure in the lower arm chamber 69 is high, e.g., when washing water is supplied to the lower arm chamber 69, and moves from the chamber communication hole 651 to the inlet hole 691, when the hydraulic pressure in the lower arm chamber 69 is low, e.g., when washing water is not supplied to the lower arm chamber 69.

The attachable unit flange 513 provided on the tower attachable unit 5 is seated on the upper surface of the switching unit body 91.

The switching unit body 91 includes a shaft through hole 92 formed through the switching unit body 91 so that the shaft 961 of the support body 92 passes through the shaft through hole 92, first openings 93 and second openings 95 formed through the switching unit body 91, and gear parts 97 and 99 respectively combined with the upper gear fastening parts 6523, 6524, 6525, 6533, 6534, and 6535 and the lower gear fastening parts 695 to rotate the switching unit body 91 in only one of the clockwise direction and the counterclockwise direction.

The shaft 961 of the support body 96 inserted into the shaft through hole 92 forms a center of rotation of the switching unit body 91.

The first openings 93 serve to open the support body through holes 965 provided on the support body 96 according to the rotation angle of the switching unit body 91, and the second openings 95 serve to open one of the second communication holes 657 and the third communication holes 658 according to the rotation angle of the switching unit body 91.

For this purpose, a distance from the shaft through hole 92 to the first openings 3 needs to be shorter than a distance from the shaft through hole 92 to the second opening 95.

Figure 7B:
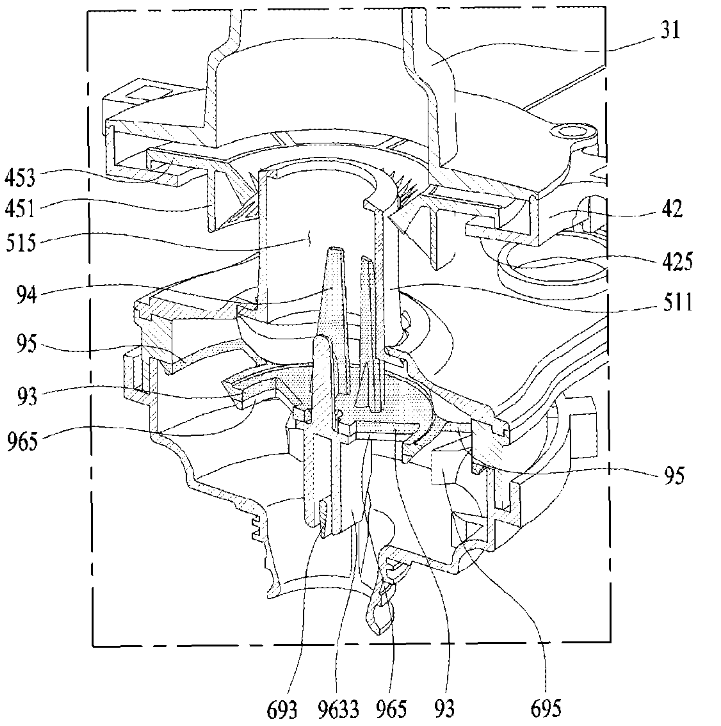
Figure 7B:
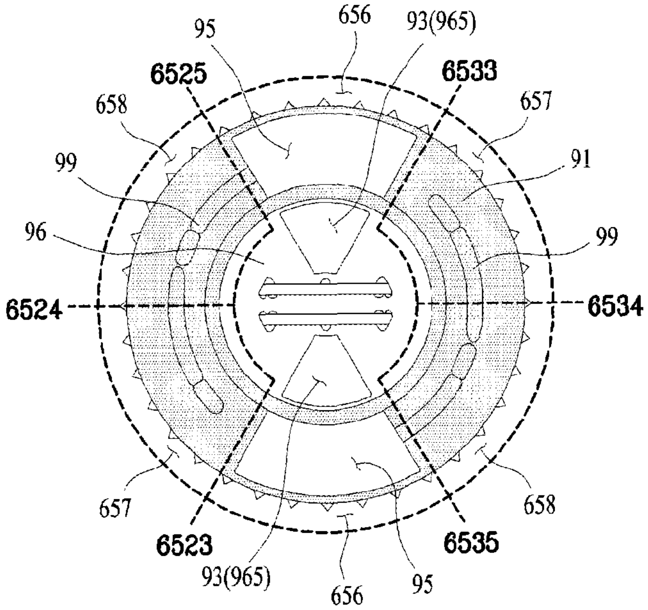

The second openings 95 may open a space formed by the first rib 6523 and the sixth rib 6535 and a space formed by the third rib 6525 and the fourth rib 6533 within the space of the first communication hole 656 when the first openings 93 open the support body through holes 965, referring to FIGS. 7B(a) and 7B(b).

For this purpose, the center of the first openings 93 and the center of the second openings 95 are located on a straight line passing through the center of the shaft through hole 92 and the first openings 93 and the second openings 95 have sizes to be located within the space formed by the first diaphragm 652 and the second diaphragm 653.

Attachable unit guiders 94 inserted into the body through hole 515 of the attachable unit body 511 may be further provided on the upper surface of the switching unit body 91. When the switching unit body 91 is raised within the lower arm chamber 69, the attachable unit guiders 94 apply pressure to the guider support part 517 so that the attachable unit body 511 may be withdrawn from the lower arm 6.

The gear parts may include upper gears 97 provided on the upper surface of the switching unit body 91 and combined with the upper gear fastening parts 6523, 6524, 6525, 6533, 6534, and 6535, and lower gears 99 provided on the lower surface of the switching unit body 91 and combined with the lower gear fastening parts 695.

The upper gears 97 are combined with the upper gear fastening parts 6523, 6524, 6525, 6533, 6534 and 6535 and rotate the switching unit body 91 by a designated angle, for example, 30 degrees, in the clockwise direction or counter-clockwise direction, and the lower gears 99 are combined with the lower gear fastening parts 695 and rotate the switching unit body 91 by a designated angle, for example, 30 degrees, in the clockwise direction or counterclockwise direction.

The lower gears 99 and the lower gear fastening parts 695 are provided so as to rotate the switching unit body 91 in the same direction as the rotation direction of the switching unit body 91 when the upper gears 97 and the upper gear fastening parts 6523, 6524, 6525, 6533, 6534, and 6535 are combined.

Hereinafter, an operating process of the lower arm 6 with reference to FIGS. 7A(a), 7A(b), 7B(a), and 7B(b) and FIGS. 8A, 8B and 8C will be described.

As shown in FIGS. 7A(a) and 7A(b), if washing water is not supplied to the lower arm chamber 69, the seated state of the support body 96 on the guider 693 is maintained and the combined state of the lower gears 99 of the switching unit body 91 with the lower gear fastening parts 695 is maintained.

Here, the support body through holes 965 is located under the space formed by the first flange 6521 and the second flange 6531 within the space formed by the first communication hole 656, the centers of the first openings 93 are separated from the centers of the support body through holes 965 by 30 degrees, e.g., only the half of each of the support body through holes 965 is opened by the first opening 93, and the second openings 95 are located between the first communication hole 656 and the third communication holes 658. In some implementations, only a part of the first communication hole 656 and only a part of each of the third communication holes 658 are opened.

When the first supply path 21 is opened through the supply path switching valve 27 and power is supplied to the motor 187 to operate the water supply pump 18, washing water is supplied to the lower arm chamber 69.

As shown in FIGS. 7B(a) and 7B(b), when washing water is supplied to the lower arm chamber 69 and the hydraulic pressure within the lower arm chamber 69 is increased, the support body 96 moves from the inlet hole 691 toward the chamber communication hole 651 and, thus, the switching unit body 91 also moves toward the chamber communication hole 651.

Since the guider combination parts 9631 and 9633 are combined with the guider 693, the support body 96 is not rotated and is raised within the lower arm chamber 69 and the switching unit body 91 is rotated by 30 degrees in the clockwise direction based on the shaft 691 when the upper gears 97 are combined with the upper gear fastening parts 6523, 6524, 6525, 6533, 6534, and 6535.

Further, the attachable unit body 511 located on the upper surface of the switching unit body 91 is withdrawn from the inside of the lower arm 6 toward the tower flow path 3 by the attachable unit guiders 94 pushing the guider support part 517 and inserted into the reception hole 455 of the connector 45.

Since the diameter of the attachable unit flange 513 is greater than the diameter of the first discharge hole 631 provided on the upper frame 63, the attachable unit body 511 is not separated from the lower arm 6.

When the switching unit body 91 is rotated by 30 degrees in the clockwise direction, the first openings 93 completely open the support body through holes 965 and the second openings 95 are located within the space formed by the first diaphragm 652 and the second diaphragm 653. In some implementations, the second openings 95 are located within the space formed by the first rib 6523 and the sixth rib 6535 and the space formed by the third rib 6525 and the fourth rib 6533.

Therefore, the closed state of the second communication holes 657 communicating with the second flow paths F2 and the third communication holes 658 communicating with the third flow paths F3 by the switching unit body 91 is maintained.

When the first openings 93 and the second openings 95 are located within the first communication hole 656, referring to FIGS. 7B(a) and 7B(b), washing water introduced into the lower arm chamber 69 is supplied only to the tower flow path 3 through the attachable unit body 511 and, thus, the tower flow path 3 sprays the washing water toward the lower rack 193.

Thereafter, when power supply to the motor 187 of the water supply pump 18 is intercepted, the hydraulic pressure within the lower arm chamber 69 is lowered and the support body 96 and the switching unit body 91 move toward the inlet hole 691 located on the bottom surface of the lower arm chamber 69.

The support body 96 moves toward the inlet hole 691 without rotation due to the guider 693 and the guide combination unit 963, but the switching unit body 91 is rotated by 30 degrees in the clockwise direction when the lower gears 99 are combined with the lower gear combination parts 695.

Figure 8A:
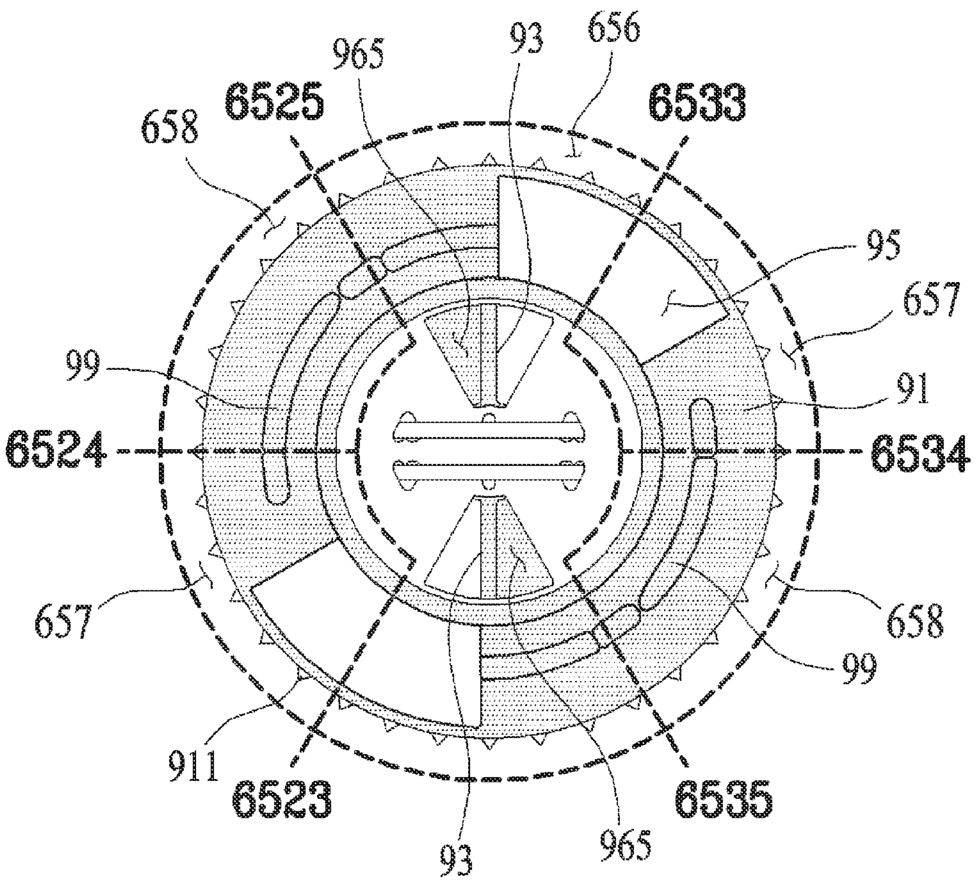

That is, as shown in FIG. 8A, the first openings 93 of the switching unit body 91 is separated from the support body through holes 965 by 30 degrees and the second openings 95 are located between the first communication holes 656 and the second communication holes 657, e.g., the second opening 95 opens a part of the first communication hole 656 and a part of the second communication hole 657.

Since the switching unit body 91 moves toward the inlet hole 691, the attachable unit body 511 is separated from the connector 45 and moves toward the lower arm 6.

Thereafter, when power is re-supplied to the motor 187 of the water supply pump 18, the support body 96 and the switching unit body 91 move again from the inlet hole 691 to the chamber communication hole 651 by the hydraulic pressure within the lower arm chamber 69.

Figure 8B:
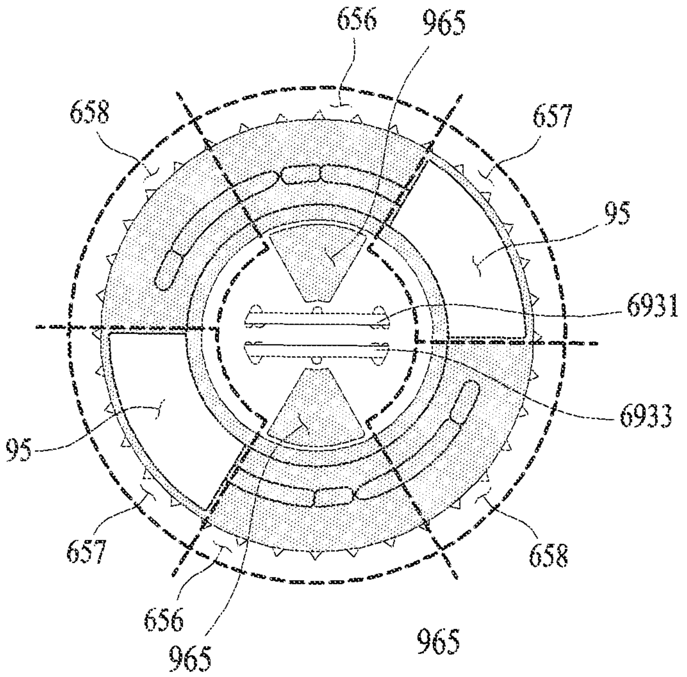

When washing water is re-supplied to the lower arm chamber 69, as shown in FIG. 8B, the switching unit body 91 is rotated by 30 degrees in the clockwise direction and, thus, the support body through holes 965 of the support body 96 are closed by the switching unit body 91 and the second openings 95 open the second communication holes 657 communicating with the second flow paths F2.

When the second communication holes 657 are opened, the washing water in the lower arm chamber 69 is supplied to the second flow paths F2 and the washing water in the second flow paths F2 is sprayed to the lower rack 193 through the second discharge holes 633.

However, since the closed state of the support body through holes 965 and the third communication holes 658 by the switching unit body 91 is maintained, washing water is not supplied to the tower flow path 3 and the third flow paths F3.

Thereafter, when power supply to the motor 187 of the water supply pump 18 is intercepted, the hydraulic pressure within the lower arm chamber 69 is lowered and the support body 96 and the switching unit body 91 move toward the inlet hole 691 located on the bottom surface of the lower arm chamber 69.

The support body 96 moves toward the inlet hole 691 without rotation due to the guider 693 and the guide combination unit 963, but the switching unit body 91 is rotated by 30 degrees in the clockwise direction when the lower gears 99 are combined with the lower gear fastening parts 695.

Here, the closed state of the support body through holes 965 by the switching unit body 91 is maintained and the second openings 95 of the switching unit body 91 are located between the second communication holes 657 and the third communication holes 658.

Figure 8C:
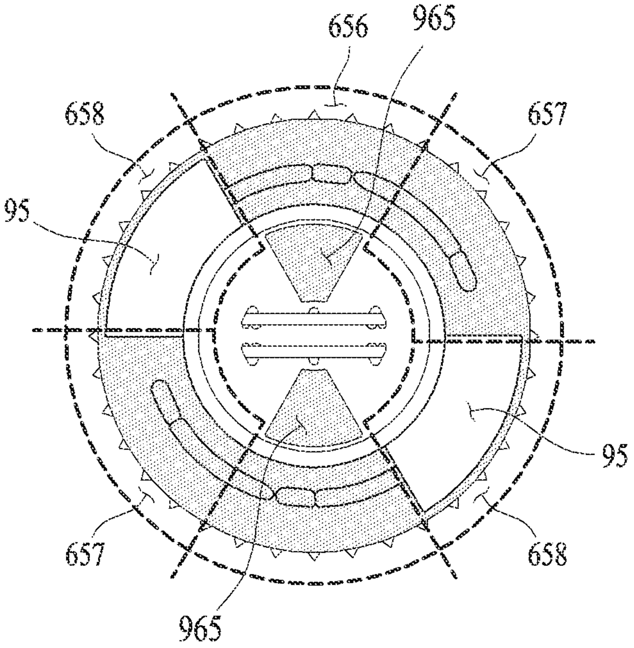

When washing water is re-supplied to the lower arm chamber 69, the support body 96 and the switching unit body 91 move from the inlet hole 691 toward the chamber communication hole 651 and, thus, reach the state of FIG. 8C.

That is, since the switching unit body 91 is rotated by 30 degrees in the clockwise direction, the third communication holes 658 communicating with the third flow paths F3 are opened by the second openings 95 and the closed state of the support through holes 965 and the second communication holes 657 by the switching unit body 91 is maintained.

Since the third communication holes 658 are opened, the washing water within the lower arm chamber 69 is sprayed to the lower rack 193 through the third flow paths F3 and the third discharge holes 635. However, the closed state of the support body through holes 965 and the second communication holes 657 by the switching unit body 91 is maintained and, thus, washing water is not supplied to the tower flow path 3 and the second flow paths F2.

Thereafter, when power supply to the motor 187 of the water supply pump 18 is intercepted, the support body 96 and the switching unit body 91 move toward the inlet hole 691 located on the bottom surface of the lower arm chamber 69 and reach the state of FIGS. 7A(a) and 7B(b).

Although the above-described implementation describes the flow path switching unit 9 as being rotated only in the clockwise direction, in some implementations, the upper gears 97, the lower gears 99, the upper gear fastening parts 6523, 6524, 6525, 6533, 6534, and 6535 and the lower gear fastening parts 695 may be provided so as to rotate the flow path switching unit 9 in the counterclockwise direction.

Figure 9A:
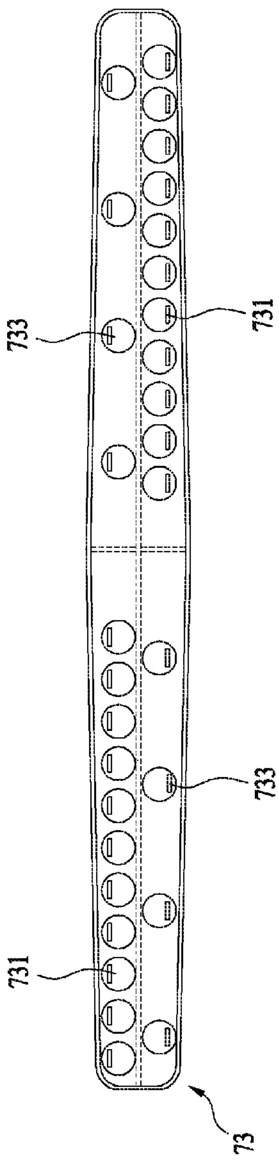
FIGS. 9A to 9C are exploded views of an example upper arm.
Figure 9B:
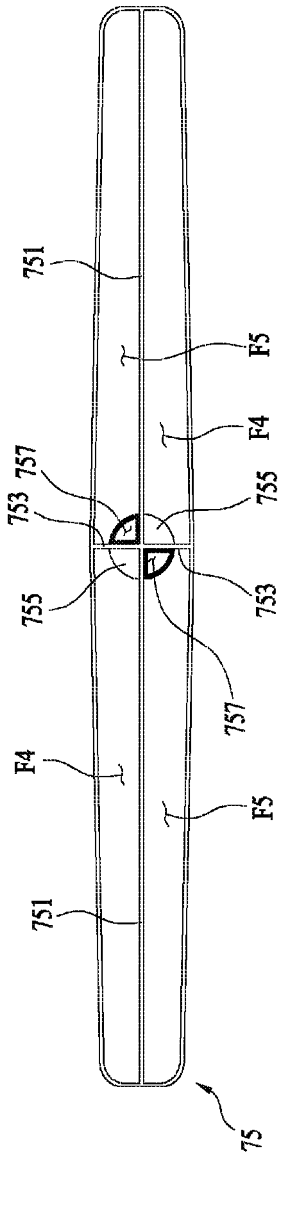
Figure 9C:
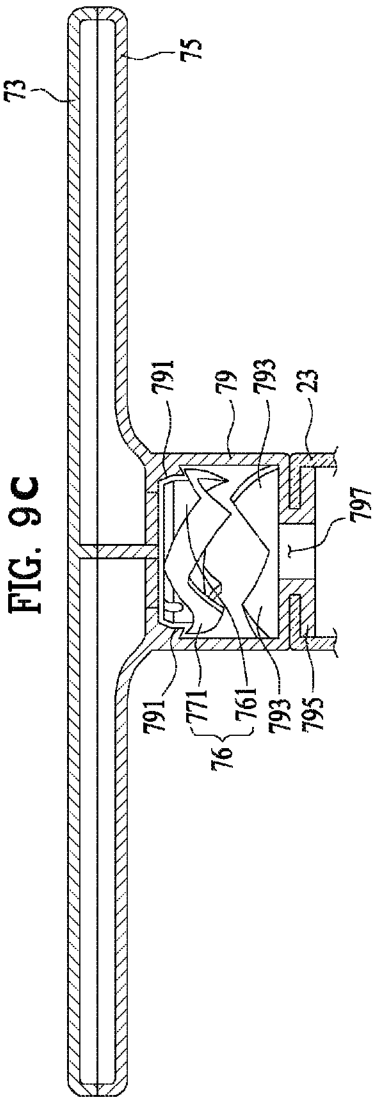

FIGS. 9A, 9B, and 9C are illustrate one example of the upper arm 7 provided in the dishwasher. The upper arm 7 shown in FIGS. 9A, 9B and 9C includes two flow paths F4 and F5 separated from each other and the first upper arm flow paths F4 and the second upper arm flow paths F5 receive washing water supplied by an upper arm flow path switching unit 76.

In some implementations, the upper arm 7 may include an upper arm chamber 70 receiving washing water supplied through the second supply path 23, an upper arm lower frame 75 communicating with the upper arm chamber 79 and having communication holes 755 and 757 communicating with the first upper arm flow paths F4 and the second upper arm lower flow paths F5, and an upper arm upper frame 73 having discharge holes 731 and 733 to discharge washing water introduced through the respective flow paths F4 and F5 to the outside of the upper rack 191.

A first upper arm diaphragm 751 and a second upper arm diaphragm 753 are provided on the upper arm lower frame 75. The first upper arm diaphragm 751 and a second upper arm diaphragm 753 are orthogonal to each other to form the first upper arm flow paths F4 and the second upper arm flow paths F5.

The upper arm lower frame 75 includes the first upper arm communication holes 755 and the second upper arm communication holes 757 communicating the respective flow paths F4 and F5 with the upper arm chamber 79.

The first upper arm communication holes 755 serve to communicate the first upper arm flow paths F4 with the upper arm chamber 79, and the second upper arm communication holes 757 serve to communicate the second upper arm flow paths F5 with the upper arm chamber 79.

One first upper arm communication hole 755 is separated from the other first upper arm communication hole 755 by 180 degrees, and one second upper arm communication hole 757 is separated from the other second upper arm communication hole 757 by 180 degrees.

The upper arm upper frame 73 is located above the upper arm lower frame 75 and includes the discharge holes 731 and 733 to discharge washing water supplied to the respective flow paths F4 and F5 to the upper rack 191.

The first upper arm discharge holes 731 serve to discharge washing water supplied to the first upper arm flow paths F4 to the upper rack 191, and the second upper arm discharge holes 733 serve to discharge washing water supplied to the second upper arm flow paths F5 to the upper rack 191.

The flow rate of washing water supplied to objects to be washed through the first upper arm flow paths F4 may differ from the flow rate of washing water supplied to objects to be washed through the second upper arm flow paths F5.

FIGS. 9A, 9B, and 9C illustrate that the number of the first upper arm discharge holes 731 is greater than the number of the second upper arm discharge hole 733 so that the flow rate of washing water supplied to objects to be washed through the first upper arm flow paths F4 and the flow rate of washing water supplied to objects to be washed through the second upper arm flow paths F5 may be different.

Washing water discharged from the first upper arm discharge holes 731 needs to be sprayed at a designated inclination angle to a plane parallel with the surface of the upper arm upper frame 73 and washing water discharged from the second upper arm discharge holes 733 needs to be sprayed at a designated inclination angle to the plane parallel with the surface of the upper arm upper frame 73.

Further, the spray direction of washing water discharged through the first upper arm discharge holes 731 and the spray direction of washing water discharged through the second upper arm discharge holes 733 may be set to be opposite each other. The reason for this is that, if the rotating direction of the upper arm 7 when the first upper arm discharge holes 731 discharge washing water and the rotating direction of the upper arm 7 when the second upper arm discharge holes 733 discharge washing water are different, washing efficiency may be raised.

The upper arm chamber 79 is fixed to the upper arm lower frame 75 so as to surround the respective communication holes 755 and 757.

The upper arm chamber 79 is rotatably combined with the second supply path 23 through a supply path connector 795, and an inlet hole 797 to supply washing water supplied through the second supply path 23 to the upper arm chamber 79 is provided on the flow path connector 795.

The upper arm flow path switching unit 76 to selectively open and close the first upper arm communication holes 755 and the second upper arm communication holes 757 is provided within the upper arm chamber 79.

The upper arm flow path switching unit 76 is rotated within the upper arm chamber 79 by a first fastening part 791 provided on the upper surface of the upper arm chamber 79 and a second fastening part 793 provided on the lower surface of the upper arm chamber 79.

The upper arm flow path switching unit 76 includes an upper arm switching body 761 reciprocating within the upper arm chamber 79 and a gear unit 771, 773 and 775 combined with the first fastening part 791 and the second fastening part 793 to rotate the upper arm switching body 761.

Figure 10A:
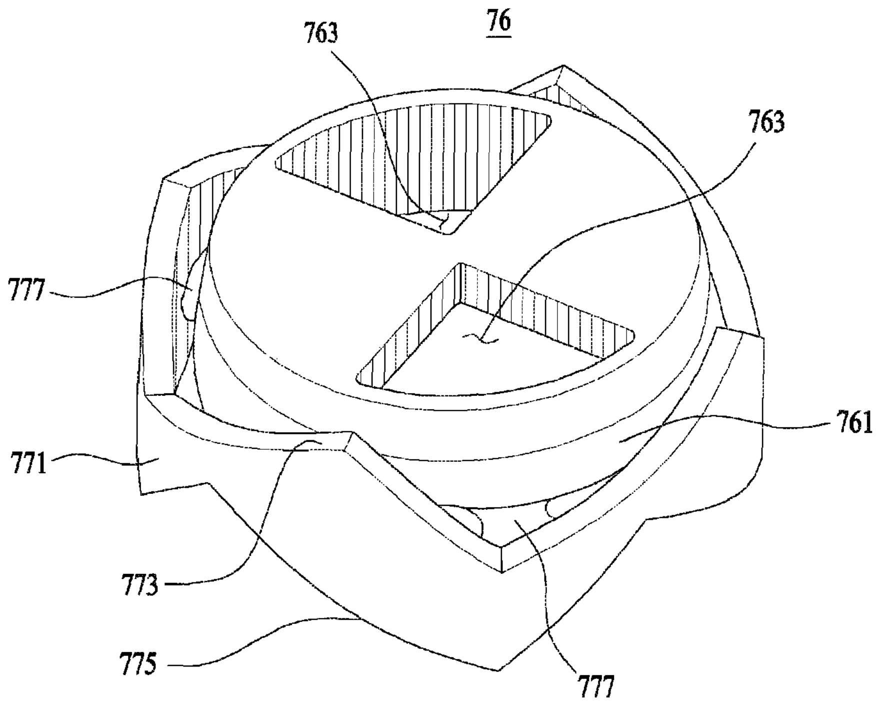
FIGS. 10A and 10B are views of an example upper arm flow path switching unit of an upper arm.
Figure 10B:
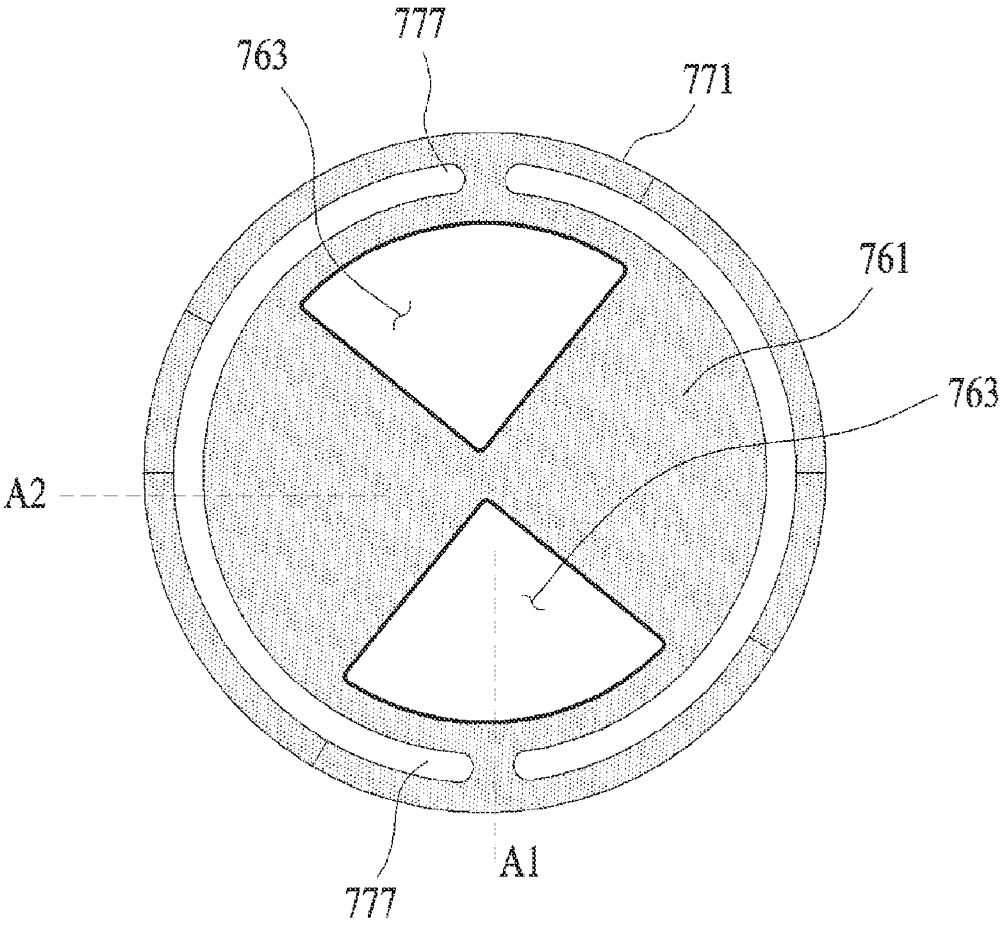

As shown in FIGS. 10A and 10B, the upper arm switching body 761 may have a cylindrical shape having a closed upper surface and an opened lower surface, and flow path openings 763 may be provided on the closed surface of the upper arm switching body 761. Two flow path openings 763 are separated from each other by 180 degrees.

The gear unit includes a gear body 771 fixed to the circumferential surface of the upper arm switching body 761, a first gear 773 provided on the upper surface of the gear body 771 and combined with the first fastening part 791, and a second gear 775 provided on the lower surface of the gear body 771 and combined with the second fastening part 793.

The gear body 771 may be fixed to the upper arm switching body 761 through a flange 777.

The first gear 773 is combined with the first fastening part 791 and rotates the upper arm switching body 761 by a designated angle in the clockwise direction or counterclockwise direction, and the first gear 775 is combined with the second fastening part 793 and rotates the upper arm switching body 761 by a designated angle in the clockwise direction or counterclockwise direction.

That is, the second gear 775 and the second fastening part 793 are provided so as to rotate the upper arm switching body 761 in the same direction as the rotation direction of the switching body 761 when the first gear 773 and the first fastening part 791 are combined.

The upper arm 7 having the above-described structure supplies washing water to the first upper arm flow paths F4 and the second upper arm flow paths F5 via a process shown in FIGS. 11A to 11D.

Figure 11A:
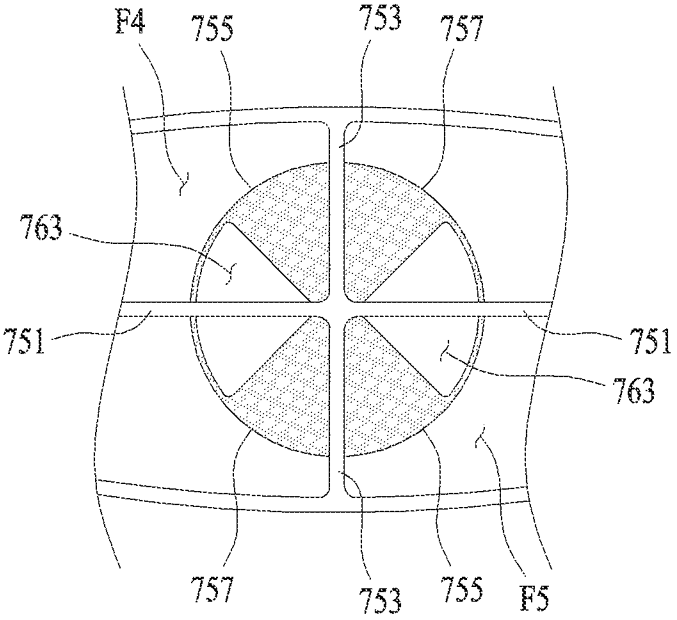
FIGS. 11A to 11D are views of an example operation process of the upper arm flow path switching unit.

If washing water is not supplied to the upper arm chamber 79, the second gear 775 of the upper arm flow path switching unit 76 is combined with the second fastening part 793 and the upper arm switching body 761 maintains the state of FIG. 11A.

That is, the separated state of the flow path openings 763 from the first upper arm communication holes 755 by 45 degrees, e.g., the separated state of the flow path openings 763 from the second upper arm communication holes 757 by 45 degrees, is maintained.

When the second supply path 23 is opened through the supply path switching valve 27 and power is supplied to the motor 187 of the water supply pump 18, washing water stored in the sump 13 is supplied to the upper arm chamber 79.

When washing water is supplied to the upper arm chamber 79, the hydraulic pressure within the upper arm chamber 79 is raised and the upper arm switching body 761 moves from the inlet hole 797 toward the upper arm lower frame 75, e.g., toward the first fastening part 791.

Figure 11B:
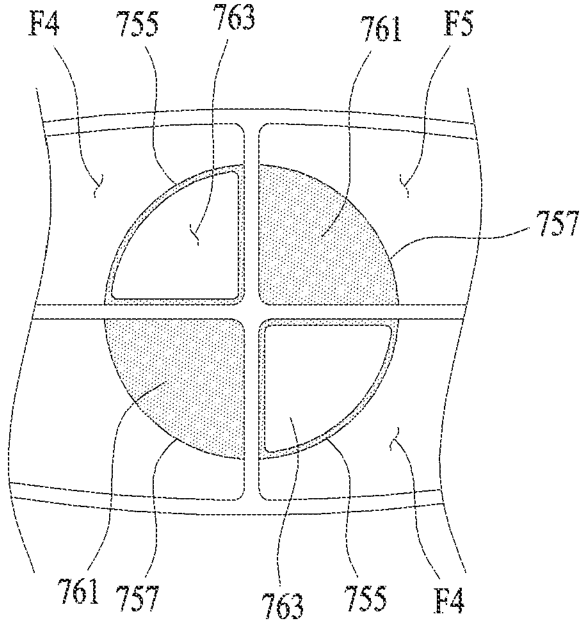

When the upper arm switching body 761 is raised within the upper arm chamber 79, the first gear 773 is combined with the first fastening part 791 and rotates the upper arm switching body 761 by 45 degrees in the clockwise direction. Therefore, as shown in FIG. 11B, the first upper arm communication holes 755 are opened by the flow path openings 763 but the second upper arm communication holes 757 are closed by the upper arm switching body 761.

When the first upper arm communication holes 755 are opened, washing water is supplied to the first upper arm flow paths F4 and the washing water within the first upper arm flow paths F4 is sprayed to the upper rack 191 through the first upper arm discharge holes 731.

Thereafter, when power supply to the motor 187 of the water supply pump 18 is intercepted, the hydraulic pressure within the upper arm chamber 79 is lowered and the upper arm switching body 761 moves toward the inlet hole 797 on which the second fastening part 793 is located.

Figure 11C:
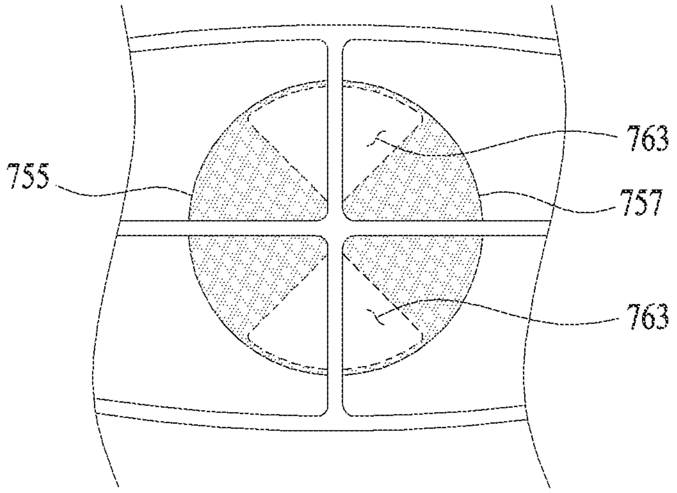

When the upper arm switching body 761 moves toward the inlet hole 797, the second gear 775 is combined with the second fastening part 793 and rotates the upper arm switching body 761 by 45 degrees in the clockwise direction. That is, as shown in FIG. 11C, the flow path openings 763 are separated from each of the first upper arm communication holes 755 and the second upper arm communication holes 757 by 45 degrees.

In such a state, when washing water is re-supplied to the upper arm chamber 79, the upper arm switching body 761 moves toward the upper surface of the upper arm chamber 79 and, thus, the first gear 733 is combined with the first fastening part 791 and rotates the upper arm switching body 761 by 45 degrees in the clockwise direction.

Figure 11D:
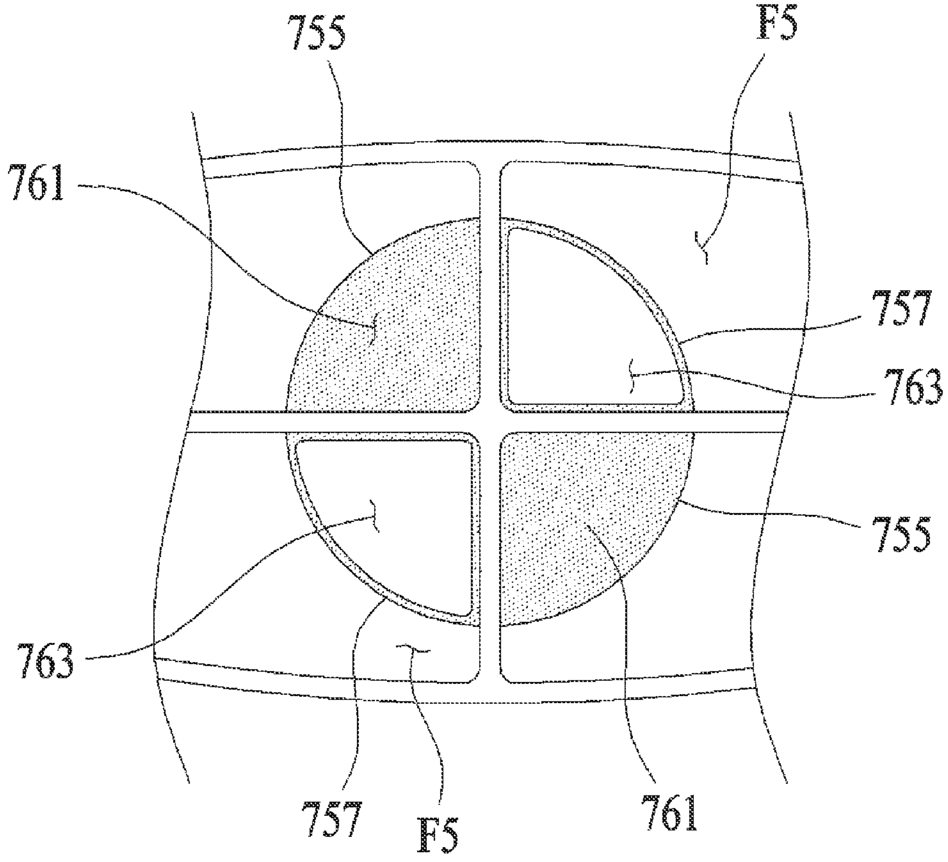

In this case, the closed state of the first upper arm communication holes 755 by the upper arm switching body 761 is maintained and the second upper arm communication holes 757 are opened by the flow path openings 763, referring to FIG. 11D. Therefore, washing water in the upper arm chamber 79 is supplied to the second upper arm flow paths F5 and then discharged to the upper rack 191 through the second upper arm discharge holes 733.

Thereafter, when power supply to the motor 187 of the water supply pump 18 is intercepted, the upper arm switching body 761 returns to the state of FIG. 11A.

Although the above-described implementation describes the upper arm flow path switching unit 76 as being rotated in the clockwise direction, in some implementations, the first gear 773, the second gear 775, the first fastening part 791, and the second fastening part 793 may be provided so as to rotate the upper arm flow path switching unit 76 in the counterclockwise direction.

Figure 12:
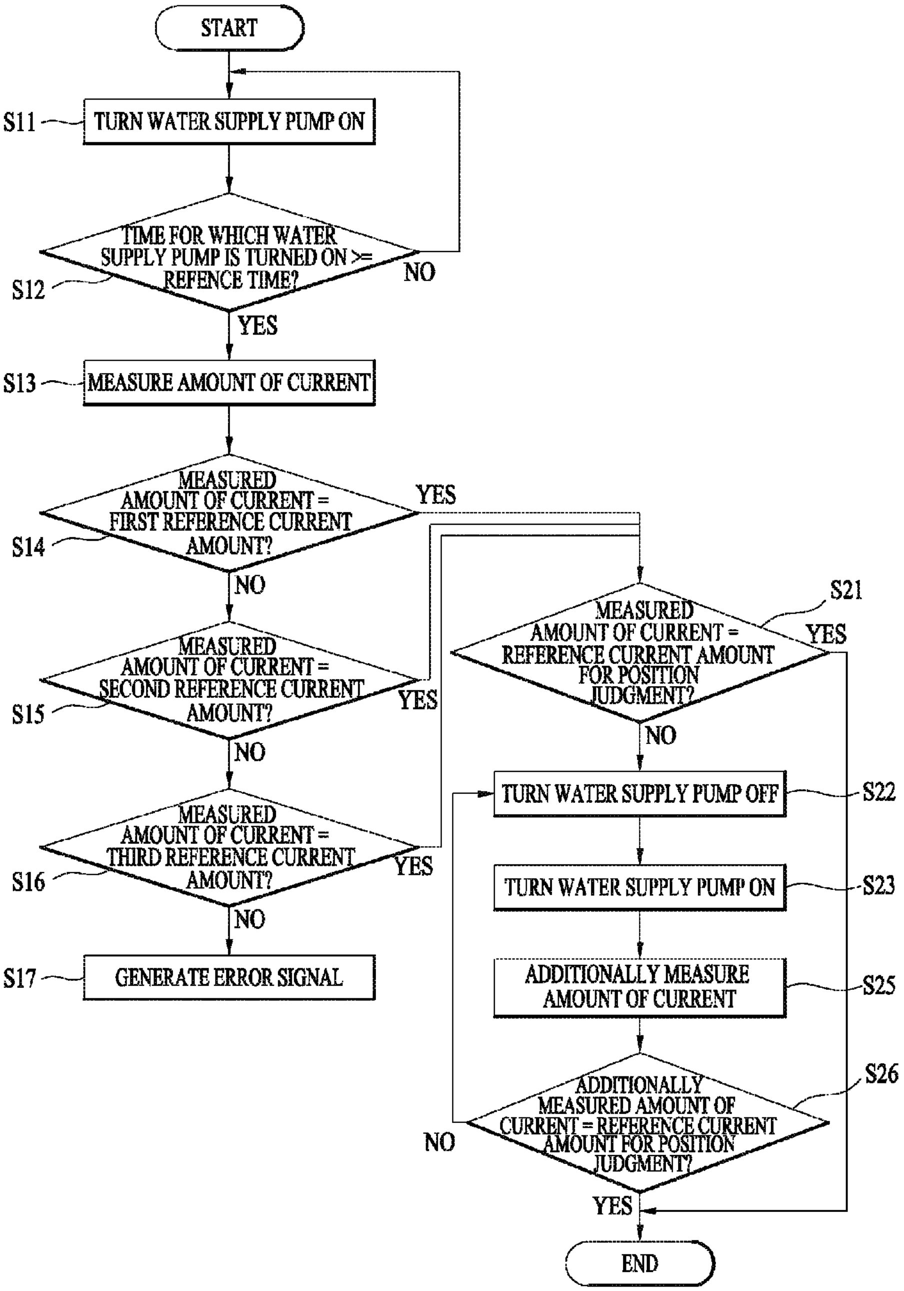
FIG. 12 is a flowchart of an example control method of a dishwasher.

FIG. 12 illustrates an example control method of a dishwasher including at least two flow paths having different flow paths to spray washing water objects to be washed.

Such a control method is characterized in that, when power is supplied to the motor 187 of the water supply pump 18 and the upper arm 7 or the lower arm 6 sprays washing water to objects to be washed, the state of the flow path switching unit 9 of the lower arm 6 or the upper arm flow path switching unit 76 and the positions of the respective flow path switching units 9 and 76 may be judged by measuring repulsive force of washing water acting on the impeller 186, a load of the impeller 186, or a load of the motor 187.

When flow rates of washing water sprayed through the flow paths F1, F2, F3, F4, and F5 provided on the respective arms 6 an d7 are different, the load of the impeller 186 is varied. The load of the impeller 186 may be judged by operating the motor 187 so that the impeller 186 maintains a designated RPM and then measuring the amount of power or the amount of current supplied to the motor 187.

However, if power of a designated intensity continues to be supplied to the motor 187, the load of the impeller 186 may be judged by measuring the RPM of the impeller 186.

Hereinafter, the control method, when the load of the impeller 186 is judged through the amount of current supplied to the lower arm 6 having three flow paths F1, F2, and F3 and the motor 187 will be described.

First, power is supplied to the motor 187 of the water supply pump 18 under the condition that the first supply path 21 is opened by the supply path switching valve 27 (S11).

When power is supplied to the motor 187, the amount of current supplied to the motor 187 is measured (S13).

In some implementations, the lower arm 6 has three flow paths F1, F2, and F3 separated from one another and at least two of the three flow paths F1, F2, and F3 have different flow rates.

The amount of current supplied to the motor 187 to supply washing water to one of the flow paths having different flow rates differs from the amount of current supplied to the water supply pump 18 to supply washing water to another of the flow paths having different flow rates. Because the load of the motor 187 is varied according to the amount, or flow rate, of washing water discharged each of the flow paths per unit time.

That is, as the amount, or flow rate, of washing water to be supplied to a flow path per unit time increases, the load of the motor 187 increases. Therefore, the amount of current supplied to the water supply pump 18 is varied according to the flow rate of the flow path.

Although the measurement (S13) may be carried out simultaneously with the supply of power to the motor 187 (S11), the measurement (S13) may be carried out after a predetermined reference time from time when power supply to the motor 187 is started has elapsed (S12).

At the initial stage of operation of the water supply pump 18, air may remain within the first supply path 21 connecting the lower arm 6 to the water supply pump 18 or air may be introduced into the water supply pump 18 according to the water level of the sump 13.

When air remains within the first supply path 21 or air is introduced into the water supply pump 18, the load of the motor 187 may not be precisely measured through the amount of current supplied to the motor 187.

Therefore, if the measurement of the amount of current (S13) is carried out after the predetermined reference time from time when power supply to the motor 187 is started has elapsed (S12), the amount of current supplied to the motor 187 may be precisely measured.

The measurement of the amount of current (S13) may be carried out for a predetermined measurement reference time, and data measured in the measurement of the amount of current (S13) may be set to be the sum of the amount of current measured for the measurement reference time or the mean amount of current (the sum of the amount of current/the measurement reference time).

When the measurement of the amount of current (S13) has been completed, the measured amount of current is compared with predetermined reference current amounts (S14, S15 and S16).

The amounts of current supplied to the motor 187 when washing water is normally supplied to the flow paths F1, F2, and F3 may be set as the reference current amounts.

That is, if the lower arm 6 has three flow paths F1, F2, and F3, a first reference current amount experimentally measured when washing water is normally supplied to the first flow path F1 (connected to the tower flow path 31), a second reference current amount experimentally measured when washing water is normally supplied to the second flow paths F2 (connected to the second discharge holes 633), and a third reference current amount experimentally measured when washing water is normally supplied to the third flow paths F3 (connected to the third discharge holes 635) may be set as reference current amounts.

If the amount of current measured in the measurement (S13) is set to be the sum of the amount of current measured for the measurement reference time, the respective reference current amounts are set to be the sums of the amounts of current supplied to the motor 187 for the measurement reference time when washing water is normally supplied to the respective flow paths F1, F2, and F3.

However, if the amount of current measured in the measurement (S13) is set to be the mean amount of current, the respective reference current amounts may be set to be the mean values of the amounts of current supplied to the motor 187 for the measurement reference time when washing water is normally supplied to the respective flow paths F1, F2, and F3.

Further, each reference current amount may be set to be data, e.g., a range value, having the maximum amount of current and the minimum amount of current.

The comparison of the amount of current measured thorough the measurement (S13) with the reference current amounts is carried out by sequentially comparing the measured amount of current with the first reference current amount, the second reference current amount and the third reference current amount (S14, S15, and S16).

In case of the lower arm 6 of the dishwasher, since the flow path F1, F2, or F3 to which washing water is supplied is changed according to the position of the flow path switching unit 9, the state of the flow path switching unit 9 as well as the flow path F1, F2, or F3 to which washing water is supplied may be judged, e.g., the current position of the flow path switching unit 9 may be judged, by comparing the amount of current measured in the measurement (S13) with the respective reference current amounts.

That is, when the amount of current measured in the measurement (S13) is equal to the first reference current amount (S14), a controller may judge that washing water is sprayed to the upper rack 191 by the tower flow path 3 through the first flow path F1.

However, when the amount of current measured in the measurement (S13) is equal to the second reference current amount (S15) or the third reference current amount (S16), the controller may judge that washing water is sprayed to the lower rack 193 through the second flow paths F2 or the third flow paths F3.

On the other hand, when the amount of current measured in the measurement (S13) is not equal to any one of the three reference current amounts, a user is notified of a warning through a character signal or a sound signal (S17).

The notification (S17) is carried out through an alarm unit controlled by the controller, and the alarm unit may include at least one of a display device and a speaker.

Through the notification (S17), the user is notified of malfunction of the dishwasher and, thus, induced to find reasons for malfunction of the dishwasher.

Non-coincidence of the amount of current measured in the measurement (S13) with any one of the three reference current amounts may be generated by various reasons, such as if the flow path switching unit 9 is not normally operated, if the tower flow path 3 is located at a position causing a difficulty in combination with the tower attachable unit 5, if the tower attachable unit 5 is not withdrawn from the lower arm 6, if the respective flow paths of the lower arm 6 are clogged with foreign substances, and the like.

Upon judging that the amount of current measured in the measurement (S13) is equal to any one of the first reference current amount, the second reference current amount and the third reference current amount (S14, S15, and S16), the flow path switching unit 9 may be moved to a predetermined initial position (S21 to S26).

Whether or not the flow path switching unit 9 is located at the initial position is judged through judgment as to whether or not the amount of current measured in the measurement (S13) is equal to a reference current amount for position judgment (S21).

One of the above-described reference current amounts may be set as the reference current amount for position judgment.

If the flow path switching unit 9 is set to sequentially open the first flow path F1, the second flow paths F2 and the third flow paths F3 and a position to supply washing water to the tower flow path 31 through the first flow path F1 is set as the initial position of the flow switching unit 9, the third reference current amount may be set as the reference current amount for position judgment.

However, if a position to spray washing water to the lower rack 193 through the second flow paths F2 is set as the initial position of the flow switching unit 9, the first reference current amount may be set as the reference current amount for position judgment and, if a position to spray washing water to the lower rack 193 through the third flow paths F3 is set as the initial position of the flow switching unit 9, the second reference current amount may be set as the reference current amount for position judgment.

In any case, when the amount of current measured in the measurement (S13) is not equal to the reference current amount for position judgment (S21), power supply to the motor 187 of the water supply pump 18 is intercepted (S22), power is re-supplied to the motor 187 of the water supply pump 18 (S23), the amount of current supplied to the motor 187 during the re-supply of power is additionally measured (S25), and whether or not the amount of current measured in the additional measurement (S25) is equal to the reference current amount for position judgment (S26).

When the interception (S22) and the re-supply of power (S23) are carried out, the flow path switching unit 9 sequentially opens the first flow path F1, the second flow paths F2 and the third flow paths F3.

Therefore, when the interception (S22), the re-supply of power (S23) and the additional measurement (S25) are repeated until the amount of current measured in the additional measurement (S25), executed during the re-supply of power (S23), is equal to the reference current amount for position judgment (S26), the flow path switching unit 9 may be moved to the initial position.

Although FIG. 12 illustrates the process for judging the position of the flow path switching unit 9 of the lower arm 6 and the state of the flow path switching unit 9, in some implementations, the control method shown in FIG. 12 may be applied to a control method for judging the position of the upper arm flow path switching unit 76 of the upper arm 7 and the state of the upper arm flow path switching unit 76.

If the control method of FIG. 12 is applied to the upper arm 7, only comparison of the amount of current measured in the measurement with the third reference current amount (S16) is omitted and a detailed description of the control method applied to the upper arm 7 will thus be omitted.

As apparent from the above description, the subject matter described may provide a dishwasher having improved washing ability and a control method thereof.

Further, the subject matter described may provide a dishwasher in which a plurality of washing water flow paths is provided on one spray arm to spray washing water, and a control method thereof.

Further, the subject matter described may provide a dishwasher having a flow path switching unit to selectively open a plurality of flow paths provided on one spray arm, and a control method thereof.

Moreover, the subject matter described may provide a dishwasher which may judge the position a flow path switching unit and the state of the flow path switching unit, and a control method thereof.

What is claimed is:

1. A control method of a dishwasher configured to spray washing water to objects to be washed, the dishwasher including at least two flow paths leading to a same spray arm and each having different flow rates, a chamber having communication holes that each communicate with a respective flow path, a water supply pump configured to supply washing water to the chamber through an impeller rotated by a motor, and a flow path switching unit located within the chamber and configured to sequentially open the communication holes based on washing water being supplied to the chamber, the control method comprising:

measuring an amount of current supplied to the motor while the motor rotates the impeller to supply washing water to the chamber; and determining a position of the flow path switching unit by comparing the amount of current supplied to the motor with reference current amounts that are each designated as an amount of current supplied to the motor when the motor rotates the impeller to supply washing water to the respective flow path.

2. The control method according to claim 1, further comprising notifying a user of malfunction of the dishwasher, based on the amount of current supplied to the motor not being equal to any of the reference current amounts.

3. The control method according to claim 2, wherein notifying the user of the malfunction of the dishwasher comprises:

notifying the user through an alarm unit located in the dishwasher by at least one of displaying a character signal on a display of the alarm unit or outputting a sound signal using a speaker of the alarm unit.

4. The control method according to claim 1, based on the amount of current supplied to the motor not being equal to a reference current amount for position judgment that is designated as one of the reference current amounts, further comprising:

intercepting, for measurement, power supplied to the motor; and measuring a second amount of current supplied to the motor while the motor rotates the impeller to supply washing water to the chamber by resupplying power to the motor.

5. The control method according to claim 4, further comprising repeating the interception and the measurement of the second amount of current until an amount of current measured in the measurement of the second amount of current is equal to the reference current amount for position judgment.

6. The control method according to claim 5, wherein a largest current amount and a smallest current amount of the reference current amounts are designated as reference current amounts for position judgment.

7. The control method according to claim 1, wherein measuring the amount of current supplied to the motor comprises:

measuring the amount of current supplied to the motor after a predetermined time from supplying power to the motor has elapsed.

8. The control method according to claim 1, wherein each of the reference current amounts is a range having a maximum current amount that is a sum of current supplied to the motor based on washing water being supplied to the at least two flow paths and a minimum current amount that is supplied to the motor based on washing water being supplied to one of the at least two flow paths.

9. A control method of a dishwasher configured to spray washing water to objects to be washed the dishwasher including three flow paths leading to a same spray arm with a first flow path having a different flow rate than a second flow path and a third flow path, a chamber having three communication holes that each communicate with a respective flow path, a water supply pump configured to supply washing water to the chamber through an impeller rotated by a motor, and a flow path switching unit located within the chamber and configured to sequentially open the communication holes based on washing water being supplied to the chamber, the control method comprising:

measuring an amount of current supplied to the motor while the motor rotates the impeller to supply washing water to the chamber by supplying power to the motor; and determining at least one of a state of the flow path switching unit or a position of the flow path switching unit by comparing the amount of current supplied to the motor with reference current amounts that are each designated as an amount of current supplied to the motor when the motor rotates the impeller to supply washing water to the respective flow paths.

10. The control method according to claim 9, further comprising notifying a user of malfunction of the dishwasher through an alarm unit located in the dishwasher by at least one of displaying a character signal on a display of the alarm unit or outputting a sound signal using a speaker of the alarm unit, based on the amount of current supplied to the motor not being equal to any of the reference current amounts.

11. The control method according to claim 9, based on the amount of current supplied to the motor is not being equal to a reference current amount for position judgment that is designated as one of the reference current amounts, further comprising:

intercepting, for measurement, power supplied to the motor; and measuring a second amount of current resupplied to the motor while the motor rotates the impeller to supply washing water to the chamber by resupplying power to the motor.

12. The control method according to claim 11, further comprising repeating the interception and the measurement of the second amount of current until the amount of current measured in the measurement of the second amount of current is equal to the reference current amount for position judgment.

13. The control method according to claim 12, wherein the reference current amount for position judgment is designated as an amount of current supplied to the motor when the motor rotates the impeller to supply washing water to the first flow path.

14. The control method according to claim 9, wherein each of the reference current amounts is a range having a maximum current amount that is a sum of current supplied to the motor based on washing water being supplied to the at least three flow paths and a minimum current amount that is supplied to the motor based on washing water being supplied to one of the at least three flow paths.

15. The control method according to claim 9, wherein measuring the amount of current supplied to the motor comprises:

measuring the amount of current supplied to the motor after a predetermined time from supplying power to the motor has elapsed.

* * * * *